US011594950B2

(12) United States Patent
Shi

(10) Patent No.: US 11,594,950 B2
(45) Date of Patent: Feb. 28, 2023

(54) LOW GROUND CURRENT AC-DC POWER SUPPLY FOR NO-NEUTRAL ELECTRICAL DEVICES AND FAULT PROTECTION THEREFOR

(71) Applicant: Leviton Manufacturing Co., Inc., Melville, NY (US)

(72) Inventor: Wen Shi, Wilsonville, OR (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 147 days.

(21) Appl. No.: 17/156,108

(22) Filed: Jan. 22, 2021

(65) Prior Publication Data

US 2022/0239218 A1    Jul. 28, 2022

(51) Int. Cl.
*H02M 1/32*       (2007.01)
*H05B 47/24*     (2020.01)
*H05B 47/25*     (2020.01)
*H02M 7/12*       (2006.01)
*H05B 47/26*     (2020.01)

(52) U.S. Cl.
CPC .............. *H02M 1/32* (2013.01); *H02M 7/12* (2013.01); *H05B 47/24* (2020.01); *H05B 47/25* (2020.01); *H05B 47/26* (2020.01); *H02M 1/325* (2021.05)

(58) Field of Classification Search
CPC ........ H02M 1/32; H02M 1/42; H02M 1/4208; H02M 1/4225; H02M 1/325; H02M 7/12; H02M 7/125; H02M 7/4803; H02M 7/4807; H05B 47/24; H05B 47/25; H05B 47/26
See application file for complete search history.

(56) References Cited

U.S. PATENT DOCUMENTS

| | | | |
|---|---|---|---|
| 7,489,088 B2 | 2/2009 | Frid | |
| 7,804,255 B2 | 9/2010 | Ostrovsky et al. | |
| 7,834,560 B2 | 11/2010 | Ostrovsky et al. | |
| 9,812,969 B2 | 11/2017 | Papismedov et al. | |
| 10,505,457 B2 | 12/2019 | Papismedov et al. | |
| 2004/0227496 A1* | 11/2004 | Hosotani | H02M 3/158 323/282 |
| 2021/0057989 A1* | 2/2021 | Jang | H02M 1/08 |
| 2022/0103003 A1* | 3/2022 | Sahoo | H02M 1/007 |

* cited by examiner

*Primary Examiner* — Nguyen Tran
(74) *Attorney, Agent, or Firm* — Matthew M. Hulihan; Heslin Rothenberg Farley & Mesiti PC

(57) ABSTRACT

An AC-DC power supply receives input AC power and outputs DC power. The converter includes a high power factor bridge rectifier, a barrier circuit with resistor(s) and capacitor(s), and a step-down switching DC-DC converter to step-down a first DC voltage to a second, lower, DC voltage for output. Additionally, fault-protection is provided by redundancy in diodes on diode legs of a bridge rectifier and capacitor(s) of a filter circuit thereof, and a fault-protection circuit to sense current from a step-down switching DC-DC converter, a first voltage from the step-down switching DC-DC converter, and/or a second voltage at an output of the step-down switching DC-DC converter, and open the circuit on a fault.

18 Claims, 15 Drawing Sheets

LOW GROUND CURRENT AC-DC POWER SUPPLY FOR NO-NEUTRAL ELECTRICAL DEVICES AND FAULT PROTECTION THEREFOR

BACKGROUND

In recent years, smart control technologies, such as wireless control, have bene incorporated as features into consumer products. Example devices are those for lighting control, such as dimmers and other forms of wall switches. In this space, there are so-called "three-wire" wall switches and "two-wire" wall switches. A three-wire wall switch unit has connections for three wires usually referred to as "line", "neutral" and "load", in addition to an Earth ground connection. Presence of the neutral connection makes incorporation of smart control technology into a three-wire wall switch not particularly difficult insofar as powering the device's smart control electronics (circuit, processor, etc.). Around the world, consumer houses and other buildings commonly utilize two-wire wall switches, having connections for only two wires "line" and "load" (in addition to the Earth ground connection). Such devices are also referred to as "no-neutral" wall switches. Challenges exist in obtaining sufficient power for a smart control circuit in such two-wire devices.

SUMMARY

Shortcomings of the prior art are overcome and additional advantages are provided through the provision of an electrical device that includes an alternating current to direct current (AC-DC) power supply configured to receive a supply of input alternating current (AC) power and to output direct current (DC) power. The AC-DC power supply includes a bridge rectifier including an output filter, the bridge rectifier configured to generate direct current from alternating current, and the bridge rectifier including the output filter having a power factor of at least 0.7; a barrier circuit electrically coupled between the AC power and the bridge rectifier, and having at least two selected from the group consisting of: a connection to the AC power, a connection to Earth ground, a connection to a first input of the bridge rectifier, and a connection to a second input of the bridge rectifier, where the barrier circuit include one or more resistors and one or more capacitors; and a step-down switching DC-DC converter electrically coupled to the bridge rectifier and configured to receive a first DC voltage from the bridge rectifier and output the DC power, the DC power having a second DC voltage lower than the first DC voltage.

The resistor(s) and capacitor(s) of the barrier circuit may be provided in varying configurations, for example: the one or more resistors and the one or more capacitors of the barrier circuit are electrically coupled in-series between the connection to the AC power and the connection to the first input of the bridge rectifier; the one or more resistors and the one or more capacitors of the barrier circuit are electrically coupled in-series between the connection to Earth ground and the connection to the second input of the bridge rectifier; the one or more capacitors of the barrier circuit includes a plurality of capacitors, where (i) a first one or more capacitors of the plurality of capacitors and the one or more resistors of the barrier circuit are electrically coupled in-series between the connection to the AC power and the connection to the first input of the bridge rectifier, and (ii) a second one or more capacitors of the plurality of capacitors are electrically coupled between the connection to Earth ground and the connection to the second input of the bridge rectifier; the one or more resistors of the barrier circuit includes a plurality of resistors, where (i) a first one or more resistors of the plurality of resistors and the one or more capacitors of the barrier circuit are electrically coupled in-series between the connection to the AC power and the connection to the first input of the bridge rectifier and (ii) a second one or more resistors of the plurality of resistors are electrically coupled between the connection to Earth ground and the connection to the second input of the bridge rectifier; the one or more capacitors of the barrier circuit includes a plurality of capacitors, where (i) a first one or more capacitors of the plurality of capacitors and the one or more resistors of the barrier circuit are electrically coupled in-series between the connection to Earth ground and the connection to the second input of the bridge rectifier and (ii) a second one or more capacitors of the plurality of capacitors are electrically coupled between the connection to the AC power and the connection to the first input of the bridge rectifier; the one or more resistors of the barrier circuit includes a plurality of resistors, where (i) a first one or more resistors of the plurality of resistors and the one or more capacitors of the barrier circuit are electrically coupled in-series between the connection to Earth ground and the connection to the second input of the bridge rectifier and (ii) a second one or more resistors of the plurality of resistors are electrically coupled between the connection to the AC power and the connection to the first input of the bridge rectifier; or the one or more resistors of the barrier circuit includes a plurality of resistors and the one or more capacitors of the barrier circuit includes a plurality of capacitors, where (i) a first one or more resistors of the plurality of resistors and a first one or more capacitors of the plurality of capacitors are electrically coupled in-series between the connection to the AC power and the connection to the first input of the bridge rectifier and (ii) a second one or more resistors of the plurality of resistors and a second one or more capacitors of the plurality of capacitors are electrically coupled in-series between the connection to Earth ground and the connection to the second input of the bridge rectifier.

In some embodiments the bridge rectifier includes a positive DC rail and a negative DC rail, where the output filter includes a filter capacitor electrically coupled between the positive DC rail and the negative DC rail, and where the bridge rectifier further includes a first additional capacitor electrically coupled between an AC connection terminal of the bridge rectifier and the positive DC rail, and a second additional capacitor electrically coupled between the AC connection terminal of the bridge rectifier and the negative DC rail, where a capacitance of the first additional capacitor and a capacitance of the second additional capacitor are each smaller than one-third a capacitance of the filter capacitor. The output filter could include a pi filter, where the filter capacitor is a first capacitor of the pi filter and the pi filter further includes a second capacitor electrically coupled between first and second DC inputs to the step-down switching DC-DC converter and an inductor electrically coupled in-series between the first capacitor and second capacitor.

In some embodiments, the step-down switching DC-DC converter includes a controlled switching device and a flywheel diode.

In some embodiments, the step-down switching DC-DC converter includes an input for the first DC voltage and an output for the DC power, an isolated converter having a controlled switching device, and a transformer with (i) the input for the first DC voltage and the isolated converter as input on a primary side of the transformer, and (ii) the output for the DC power as output on a secondary side of the transformer.

Additional aspects described herein provide an electrical device that includes a bridge rectifier having four diode legs, each diode leg of the four diode legs having a respective plurality of diodes electrically coupled in-series, and the bridge rectifier further having a positive directed current (DC) rail and a negative DC rail; a step-down switching DC-DC converter; and a fault-protection circuit, where the fault-protection circuit is configured to perform sensing (i) current from the step-down switching DC-DC converter, (ii) a first voltage from the step-down switching DC-DC converter, and/or (iii) a second voltage, the second voltage being an output voltage at an output of the step-down switching DC-DC converter.

In some embodiments, the fault-protection circuit is further configured to perform detecting (i) a fault inside the step-down switching DC-DC converter based on sensing the current or the first voltage, or (ii) a fault at the output of the step-down switching DC-DC converter based on sensing the second voltage; and based on detecting the fault inside the step-down switching DC-DC converter or the fault at the output of the step-down switching DC-DC converter, triggering opening a switch of the fault-protection circuit between a return of the output voltage from the step down switching DC-DC converter and the negative DC rail of the bridge rectifier.

In some embodiments, the electrical device further includes a pi filter that has (i) a first plurality of capacitors electrically coupled between the positive DC rail of the bridge rectifier and the negative DC rail of the bridge rectifier, (ii) a second plurality of capacitors electrically coupled between a positive DC input of the step-down switching DC-DC converter and a return of the fault-protection circuit, and (iii) an inductor electrically coupled between the first plurality of capacitors and the second plurality of capacitors. In some examples, the fault-protection circuit is coupled between a return rail of the pi filter and the negative DC rail of the bridge rectifier.

In some embodiments the electrical device further includes a plurality of capacitors electrically coupled in-series between the positive DC rail of the bridge rectifier and the negative DC rail of the bridge rectifier.

In some embodiments the electrical device includes a capacitor electrically coupled between a positive DC input and a negative DC input to the step-down switching DC-DC converter, where the fault-protection circuit is electrically coupled between a return of the output voltage and the negative DC rail of the bridge rectifier.

Further, a method is provided to facilitate fault-protection for a power supply using ground leakage current. The method includes providing a bridge rectifier of the power supply, the bridge rectifier including, on each diode leg of the bridge rectifier, a respective first diode and a respective additional diode redundant to the first diode, and the bridge rectifier configured to generate and output direct current (DC) power from alternating current (AC); providing a filter circuit for the bridge rectifier, the filter circuit including at least one first capacitor and at least one additional capacitor redundant to the at least one first capacitor; and providing a fault-protection circuit having a switch, the fault-protection circuit being configured for electrical coupling between a return of input DC power to a step-down switching DC-DC converter and a return rail of rectified DC voltage of the output DC power generated by the bridge rectifier, and the fault-protection circuit being configured to perform opening the switch based on sensing a current fault or voltage fault.

In some embodiments providing the bridge rectifier provides each diode leg of the bridge rectifier with two diodes electrically coupled in-series. Additionally or alternatively, the filter circuit may have a respective additional capacitor redundant in-series to each first capacitor.

In some embodiments, the fault-protection circuit is further configured to perform sensing current from the step-down switching DC-DC converter; sensing a first voltage from the step-down switching DC-DC converter; sensing a second voltage at an output of the step-down switching DC-DC converter; and sensing the current or voltage fault as (i) a fault inside the step-down switching DC-DC converter based on the sensed current or sensed first voltage, or (ii) a fault at the output of the step-down switching DC-DC converter based on sensing the second voltage.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Described herein are example approaches for powering electronic devices, such as wall switches described herein that can provide smart lighting control, via AC-DC power supplies, and providing fault-protection for such devices.

As context for aspects described herein, many countries have an electric grid infrastructure that uses alternating current (AC) as a power source (referred to herein as an "AC source"). These systems can be either balanced or unbalanced and may include a phase line ("phase conductive path") and a return path (usually referred to as a "neutral" line or "neutral conductive path"). The neutral conductive path can be used as a return path for the AC source supplied by a phase conductive path. A conductive path can also be referred to as a "wire". The terms "conductive path", "conductor", and "wire" are considered herein to be synonymous. For safety reasons, the neutral wire is typically grounded at some juncture, for instance the main electrical panel. Although a ground wire is typically present at all electrical boxes, a neutral wire may not be present in some electrical boxes, such as switch boxes used to control a lighting load. In such instances, the electrical box typically contains a phase wire, a load wire, and a ground wire (or ground connection via a metal sheath of the electrical cable). As such, the lighting load is to be controlled by a device referred to as a "two-wire" device (examples of which are a switch or a dimmer), where the phrase "two-wire" refers to the phase wire and the load wire (e.g. the absence of a neutral wire). A two-wire device does not exclude the possibility of the device being connected to a third, ground wire.

Figure 1:
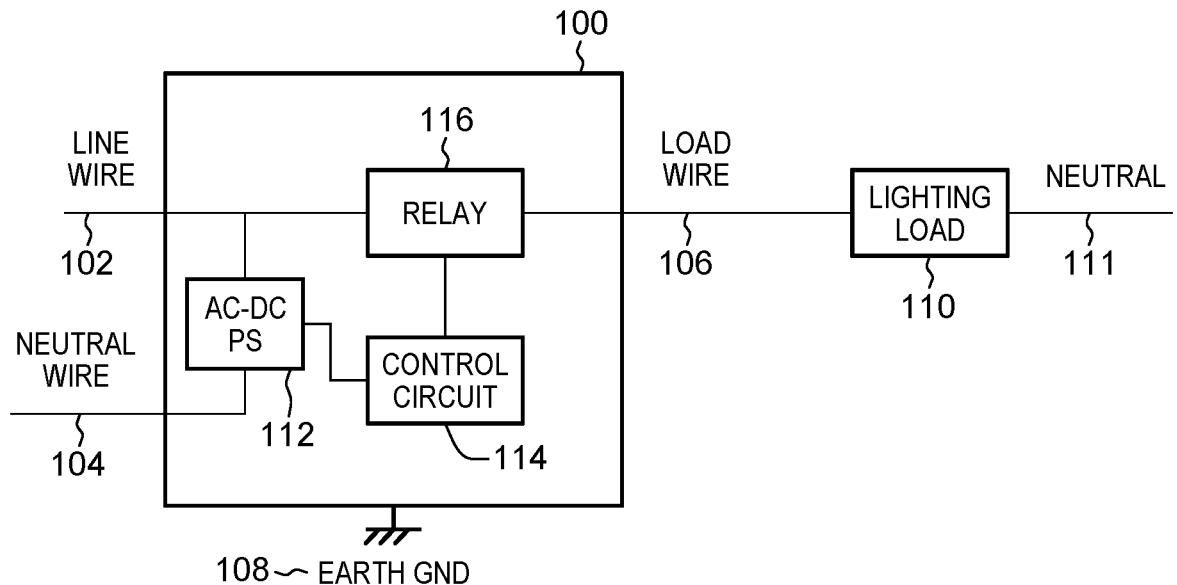
FIG. 1 depicts an example three-wire wall switch device for smart lighting control.

As noted above, the presence of a neutral connection in a three-wire wall switch unit having connection to line, neutral and load, renders it easier to provide power necessary for smart control than it does for two-wire switches. FIG. 1 depicts an example three-wire wall switch device for smart lighting control. The device 100 has respective connections for line (line wire 102), neutral (neutral wire 104), and load (load wire 106), in addition to its connection to Earth ground 108. Device 100 provides power to lighting load 110 via line wire 106, which also has a connection to neutral 111 as a return to the AC source. Device 100 includes an alternating current to direct current (AC-DC) power supply 112 (which may be isolated or non-isolated) that receives input AC power from the line 102 and neutral 104 connections, and generates a low voltage direct current (DC) power to supply to a controller, i.e. control circuit 114. Control circuit 114 drives a signal provided to relay 116, for instance a switch circuit, for switching AC power on the load connection and thereby provide power to the lighting load 110.

Control circuit 114 may be a 'smart' control circuit that connects to a network, typically a wireless network. This enables wireless communication functions, such as obtaining information/data from sensors and/or receiving commands from a remote controller. Based on the received information and commands, the control circuit 114 drives the relay 116 on and off, thus selectively controlling power to the lighting load 110. The power supply 112 is expected to provide enough DC power to the control circuit 114 to enable desired, and potentially complex, control over the relay 116. Example wireless protocols with which the control circuit may be expected to work include, but are not limited to, WiFi (a trademark of the Wi-Fi Alliance, Austin, Tex.), Bluetooth Low Energy BLE, also referred to as Bluetooth LE, BLE, and Bluetooth Smart (some or all of which are trademarks of Bluetooth Special Interest Group, Kirkland, Wash.), and Zigbee (a trademark of Zigbee Alliance, Davis, Calif.).

The available neutral connection of a three-wire device enables the power supply to derive power from the connections to line and neutral. However, challenges exist in obtaining sufficient power for some control circuits, for instance smart controls, in two-wire devices. Various approaches exist that attempt to address these challenges.

Figure 2:
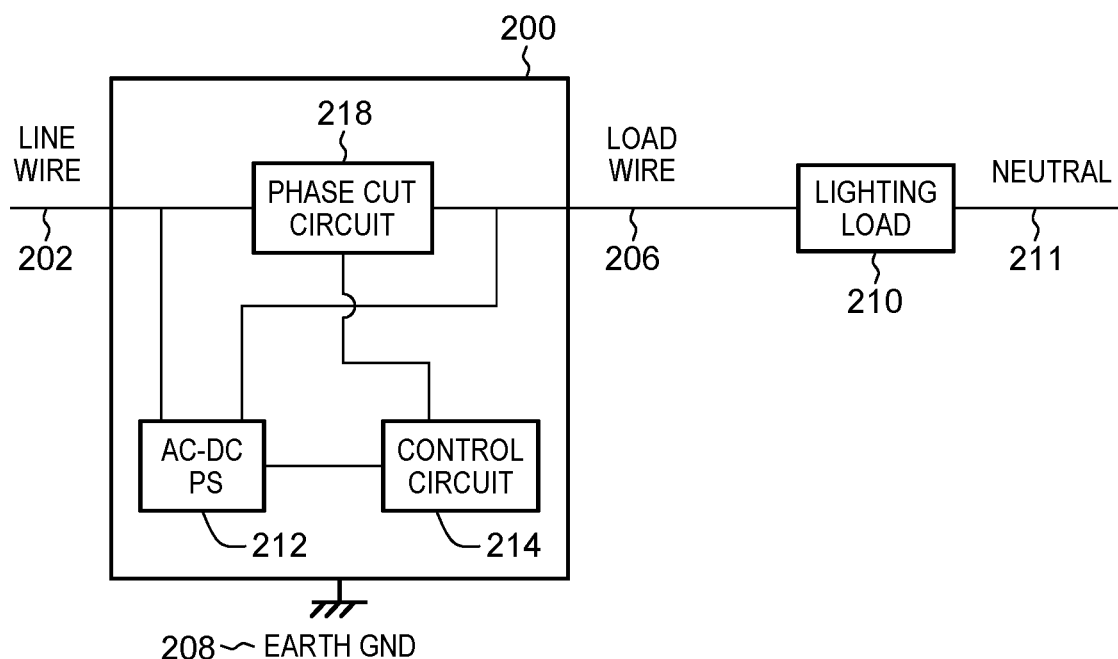
FIG. 2 depicts an example two-wire wall switch that obtains control power via phase-cutting.

One such approach to derive control power is to insert a phase cut circuit between the line and load connections. FIG. 2 depicts an example two-wire wall switch that obtains control power via phase-cutting. Here, device 200 has a connection to line (line wire 202), load (load wire 206) and Earth ground 208. Similar to the device 100 of FIG. 1, device 200 includes AC-DC power supply 212 that powers a control circuit 214. Here, control circuit 214 controls phase cut circuit 218 electrically coupled between the line and load connections to provide power to lighting load 210, with the return again being via neutral 211.

During the 'off-time' of a phase cut, when a portion of the AC waveform is 'cut', i.e. power to the lighting load 210 along load wire 206 is cut, there is voltage between line and load. AC-DC power supply 212 is designed to utilize this voltage as input to generate a low voltage DC power to supply the control circuit 214. This method has restrictions. For one, it requires a minimum load to operate the switch properly. If the load is too small, impedance of the load become very large so the AC-DC power supply may not have enough input voltage to use and therefor may not be able to generate a stable low voltage DC. Additionally, the conducted phase angle has an upper limit near 180 degrees; beyond this limit, the power supply does not have enough input energy to operate properly and thus it is not able to deliver full power to the load. Furthermore, this approach does not work with some smart bulbs. When the smart bulbs are turned off remotely and the circuit is shut off, the power supply has no energy to supply to the control circuit for subsequent operation.

Figure 3:
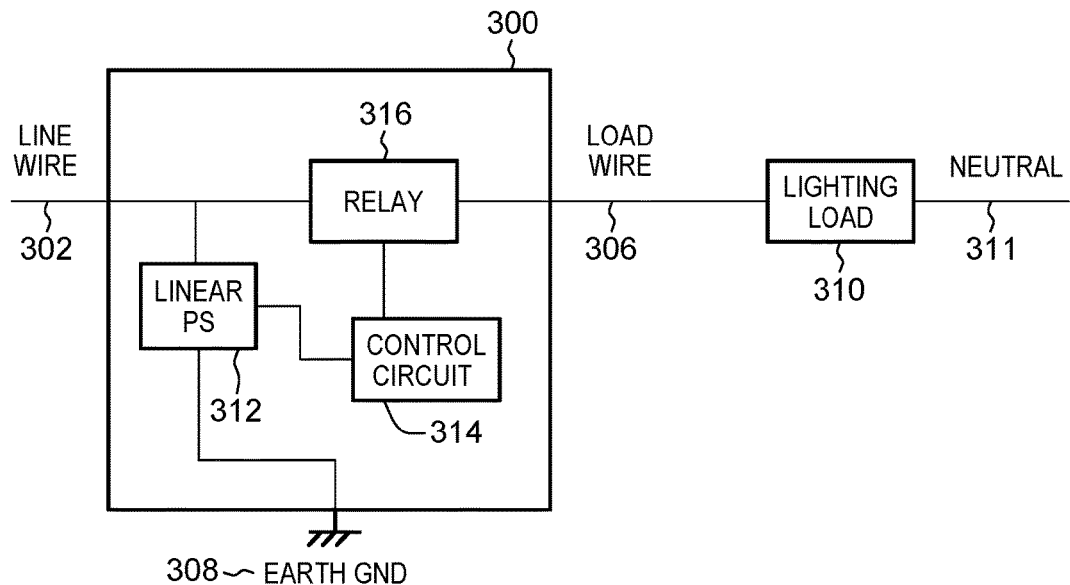
FIG. 3 depicts an example two-wire wall switch that obtains control power via Earth ground leakage current using a linear power supply.

Another approach to derive control power is to use a linear power supply circuit to drain a small amount of Earth ground current to power the control circuit. FIG. 3 depicts an example two-wire wall switch that obtains control power via Earth ground leakage current using a linear power supply. Device 300 has a connection to line (line wire 302), load (load wire 306) and Earth ground 308. Device 300 includes linear AC-DC power supply 312 that powers control circuit 314, which drives a signal to relay 316 electrically coupled between the line and load connections to provide power to lighting load 310, with the return again being via neutral 311. The small amount of Earth ground current is available on account of the connection of the power supply 312 between line 302 and Earth ground 308.

Safety standards and specifications, such as the National Electrical Code (NEC) published by the National Fire Protection Association or the UL Standards promulgated by Underwriters Laboratories, may dictate tolerable levels of ground current leakage. The tolerable levels are those that must not be exceeded and are generally ultra-small values, for example 0.7 milliamperes (mA) or 0.5 mA. Per the UL60730-1 specification, for instance, this limit is 0.7 mA and per the UL773, UL916 and UL1472 specifications this limit is 0.5 mA. For a linear regulator, the output current is equal to or smaller than the input current, which means under these standards the current of the low voltage DC power supply (e.g. 312) is to be smaller than 0.5 mA or 0.7 mA. Such a small current cannot support some complicated smart controller, such as those that communicate using wireless protocols such as WiFi, BLE, or Zigbee, as examples.

A switching AC-DC power supply may be more efficient to attaining low voltage DC utilizing an ultra-small ground current. However, insertion of a switching AC-DC power supply circuit between line and Earth ground comes with some critical compliance challenges. These include but not limited to:

- the current to the Earth ground cannot exceed the applicable ground leakage current limit (e.g. 0.5 mA or 0.7 mA as examples);
- the circuit shall be able to withstand a high-potential test between the line and the Earth ground. An example such test is one with applied voltage of a few kilovolts (kV) that lasts 60 seconds; and
- the circuit shall be able to survive many input voltage surge strikes between the line and Earth ground. Example such strikes can be a few kV, appear at different angles of the AC waveform, and last a few microseconds at each strike.

In some aspects described herein, a low ground current no-neutral AC-DC power supply is disclosed that supplies enough DC power for desired complicated smart control of a two-wire wall switch or other electrical device, and addresses the previous compliance challenges. Example levels of DC power provided by embodiments disclosed herein utilizing ultra-small ground leakage current (e.g. less than 0.7 or 0.5 mA) are between 5 mA and 15 mA, inclusive, to power a control circuit load that consumes a relatively small amount of power (levels in the tens of milliwatts). Such an AC-DC power supply could be incorporated into any electrical device having a control circuit of this power specification, for instance two-wire wall switches for smart lighting control as described herein.

In some aspects, an AC-DC power supply that receives AC input from connections to line and Earth ground and generates relatively low-voltage DC power for powering a control circuit includes an input resistor-capacitor barrier (referred to herein as a "barrier circuit"), a high power factor full bridge rectifier, and a step-down switching DC-DC converter able to reach desired ultra-low ground current (less than 0.7 mA) and meet other desired specifications, such as the ability to withstand high voltage short pulses or long duration strikes, such as high-potential tests, surges, electrical fast transient bursts, and electrostatic discharge, as examples.

Figure 4:
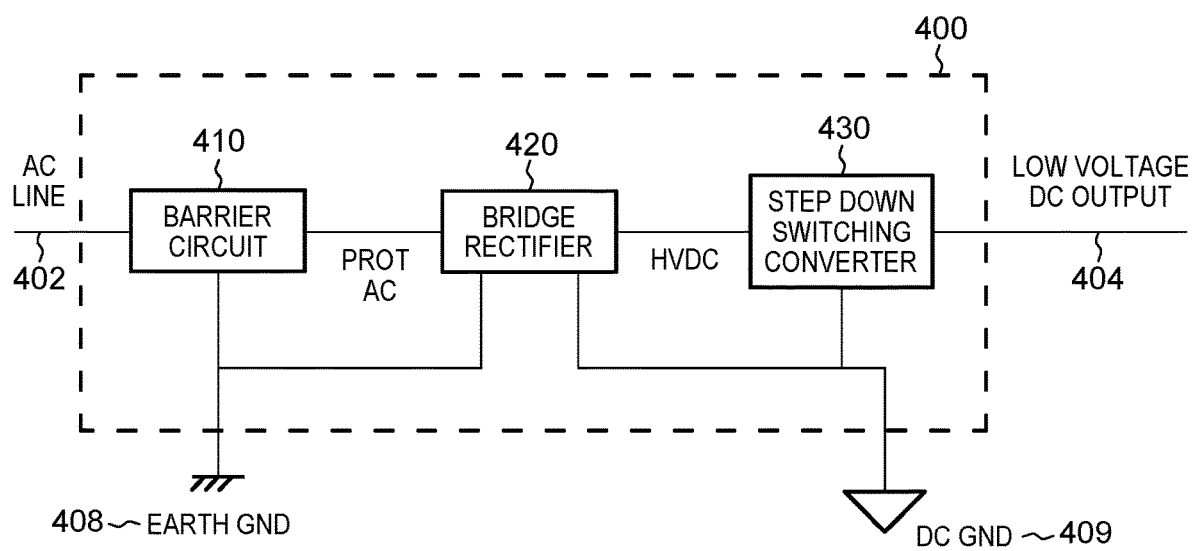
FIG. 4 depicts an embodiment of an alternating current to direct current (AC-DC) power supply in accordance with aspects described herein.

FIG. 4 depicts an embodiment of an AC-DC power supply in accordance with aspects described herein. The AC-DC power supply is a no-neutral power supply utilizing suitably low ground current. AC-DC power supply 400 has a connection to a supply of input AC power (AC line 402), an output of DC power (low voltage DC output 404), a connection for Earth ground 408, and a connection for DC ground 409 (which may be a floating ground).

The power supply 400 includes a barrier circuit 410 electrically coupled between the AC power 402 and a bridge rectifier 420 providing protected AC voltage to the bridge rectifier, and also includes a step-down switching DC-DC converter 430 that is electrically coupled to bridge rectifier 420, taking high voltage DC output therefrom, stepping it down to low voltage DC, and outputting that DC power 404.

Barrier circuit 410 can include one or more resistors and one or more capacitors, and have a connection to the AC power 402, a connection to Earth ground 408, a connection to a first input of the bridge rectifier 420, and/or a connection to a second input of the bridge rectifier 420, depending on varying scenarios described below. The barrier circuit 410 builds a protection barrier to protect the later stages (420, 430, etc.) from damage by voltage spikes on the input side.

The protected AC voltage from the barrier circuit 410 is applied to the second stage—the bridge rectifier 420. Bridge rectifier 420 can be a full bridge rectifier, and includes an output filter as described herein. It is configured to generate a high-voltage DC from the input protected AC and supply that DC to the third stage, the step-down switching DC-DC converter. The rectifier can have a high power factor. Power factor refers to the ratio of real power absorbed by the load to the apparent power flowing in the circuit. A higher power factor correlates to greater conformity between the waveform of input current and the input AC sine waveform. For a given level of power, a lower power factor correlates to higher input current, and a higher power factor correlates to lower input current. In the context of this description, a "high" power factor is defined to mean a power factor of at least 0.7. Such a high power factor enables input current to the AC-DC power supply to be kept smaller, while delivering the desired level of power.

The step-down switching DC-DC converter 430 is electrically coupled to the bridge rectifier 420 and is configured to receive a first DC voltage from bridge rectifier 420 and output DC power of a second DC voltage that is lower than the first DC voltage. In some examples, the output DC power 404 from the converter 430 has a current of between 5-15 mA, inclusive, and the output second voltage is between 1 and 5 volts (V), inclusive. More particularly, output second voltage can may typically be 1.8, 2.5, 3.0, 3.3 or 5.0 V.

The resistors and capacitors of the barrier circuit 410 are series-connected in any of varying configurations. FIGS. 5A-5G depict example embodiments of a barrier circuit for an AC-DC power supply in accordance with aspects described herein. In each embodiment, the resistors can be one or more in quantity, are selected with proper physical size and resistance to withstand high-voltage, narrow pulse strikes, and allow enough current to flow to the next stage—the high power factor full bridge rectifier 420. Additionally, in each embodiment the capacitors can be one or more in quantity, are selected with proper capacitance and voltage rating to withstand high-voltage, extended-duration strikes, and allow enough current to flow to the next stage—the high power factor full bridge rectifier 420.

In each embodiment of FIG. 5A-5G, the respective example barrier circuit 510 is depicted with a connection to AC power (line 502) and connection to Earth ground 508, and output AC connections 516 and 518, as first and second AC inputs respectively, to the bridge rectifier (not pictured). Each barrier circuit 510 of FIGS. 5A-5G includes at least one set of one or more resistors (connected in-series if multiple are present in each set), and at least one set of one or more capacitors (connected in-series if multiple are present in each set).

Figure 5A:
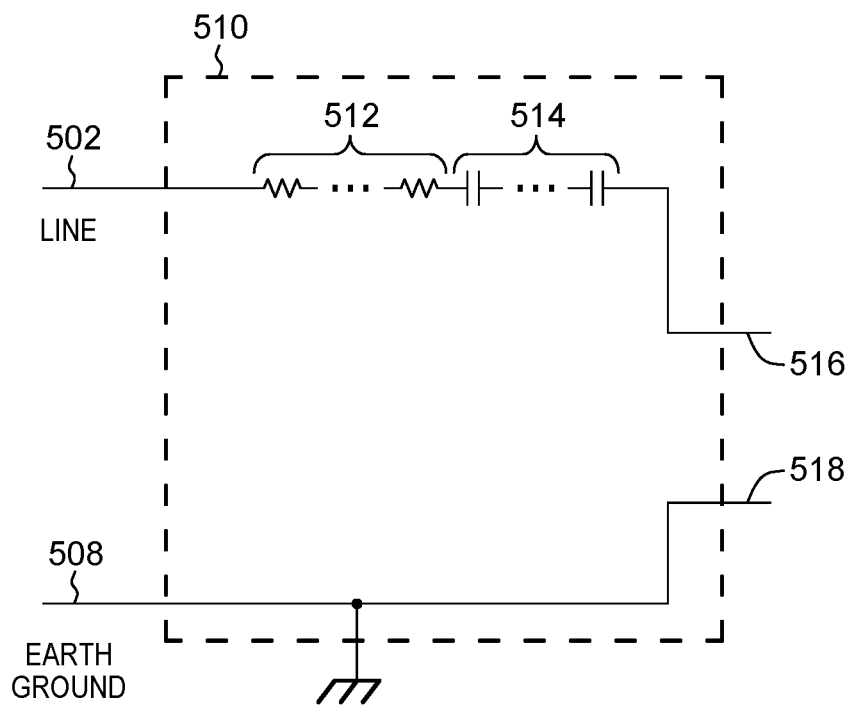
FIGS. 5A-5G depict example embodiments of a barrier circuit for an AC-DC power supply in accordance with aspects described herein.

Referring to the barrier circuit 510 of FIG. 5A, one or more resistors 512 and one or more capacitors 514 are electrically coupled in-series between the connection to the AC power (line 502) and the connection to the first input (516) of the bridge rectifier.

Figure 5B:
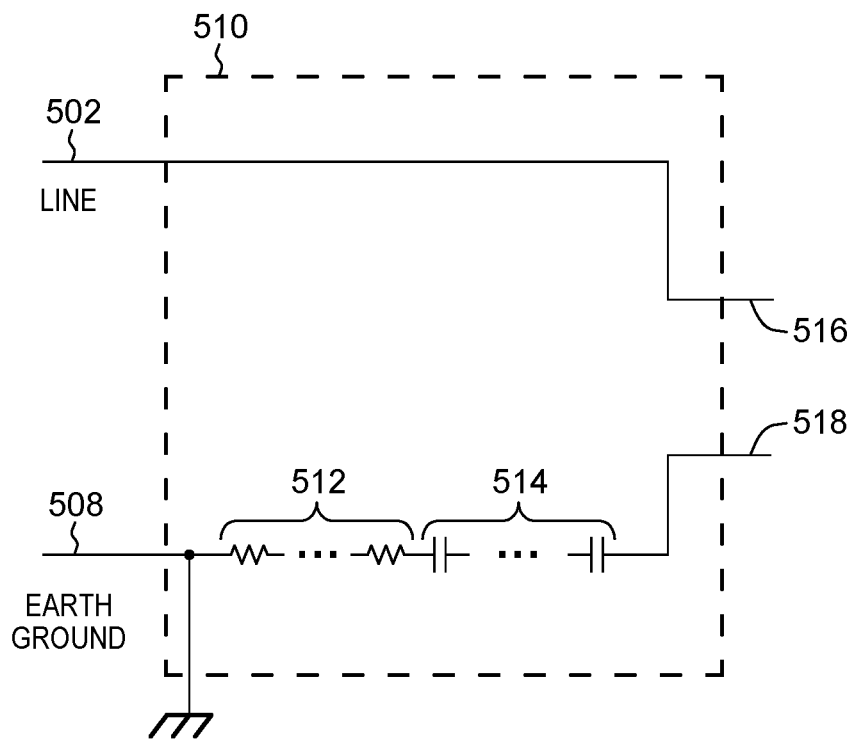

Referring to the barrier circuit 510 of FIG. 5B, one or more resistors 512 and one or more capacitors 514 are electrically coupled in-series between the connection to Earth ground (508) and the connection to the second input (518) of the bridge rectifier.

Figure 5C:
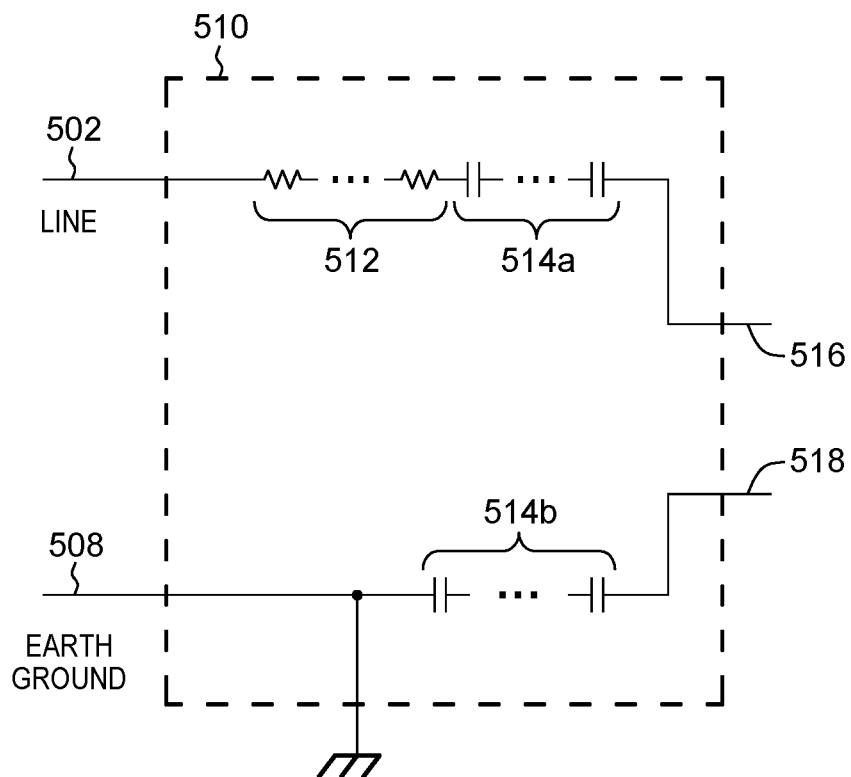

Referring to the barrier circuit 510 of FIG. 5C, there are plurality of capacitors, in which (i) a first one or more capacitors 514a and one or more resistors 512 are electrically coupled in-series between the connection to the AC power (line 502) and the connection to the first input (516) of the bridge rectifier, and (ii) a second one or more capacitors 514b are electrically coupled between the connection to Earth ground (508) and the connection to the second input (518) of the bridge rectifier.

Figure 5D:
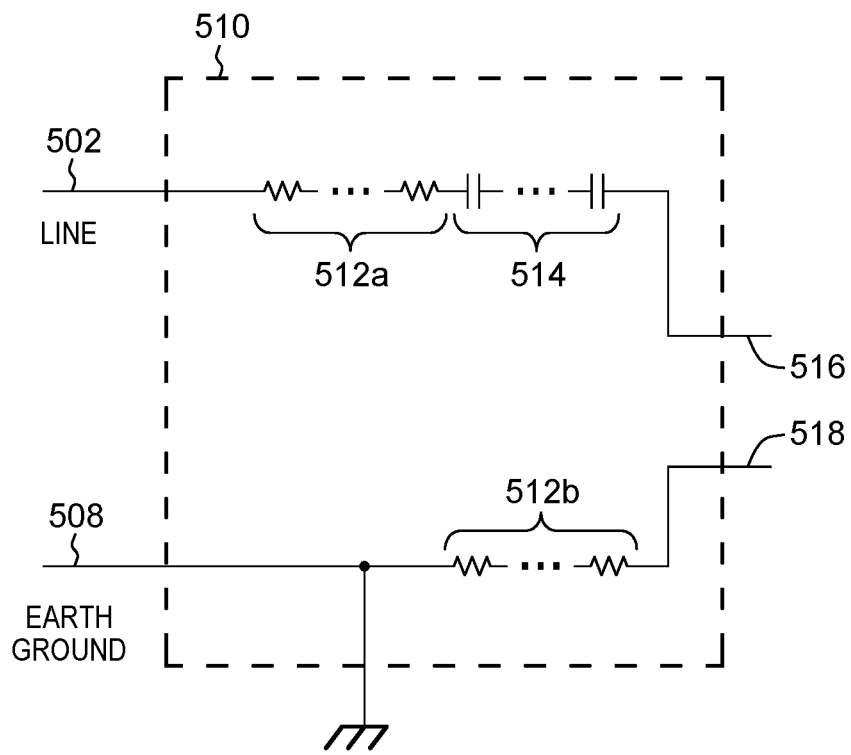

Referring to the barrier circuit 510 of FIG. 5D, there are plurality of resistors, in which (i) a first one or more resistors 512a and one or more capacitors 514 are electrically coupled in-series between the connection to the AC power (line 502) and the connection to the first input (516) of the bridge rectifier, and (ii) a second one or more resistors 512b are electrically coupled between the connection to Earth ground (508) and the connection to the second input (518) of the bridge rectifier.

Figure 5E:
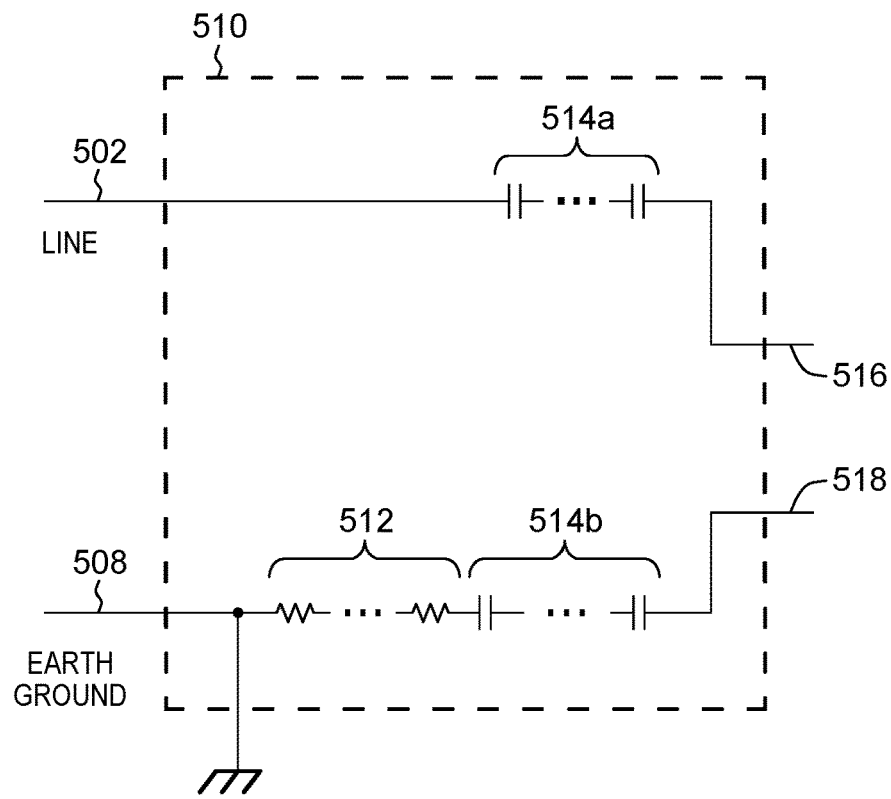

Referring to the barrier circuit 510 of FIG. 5E, there are plurality of capacitors, in which (i) a first one or more capacitors 514a are electrically coupled between the connection to the AC power (line 502) and the connection to the first input (516) of the bridge rectifier, and (ii) one or more resistors 512 and a second one or more capacitors 514b are electrically coupled in-series between the connection to Earth ground (508) and the connection to the second input (518) of the bridge rectifier.

Figure 5F:
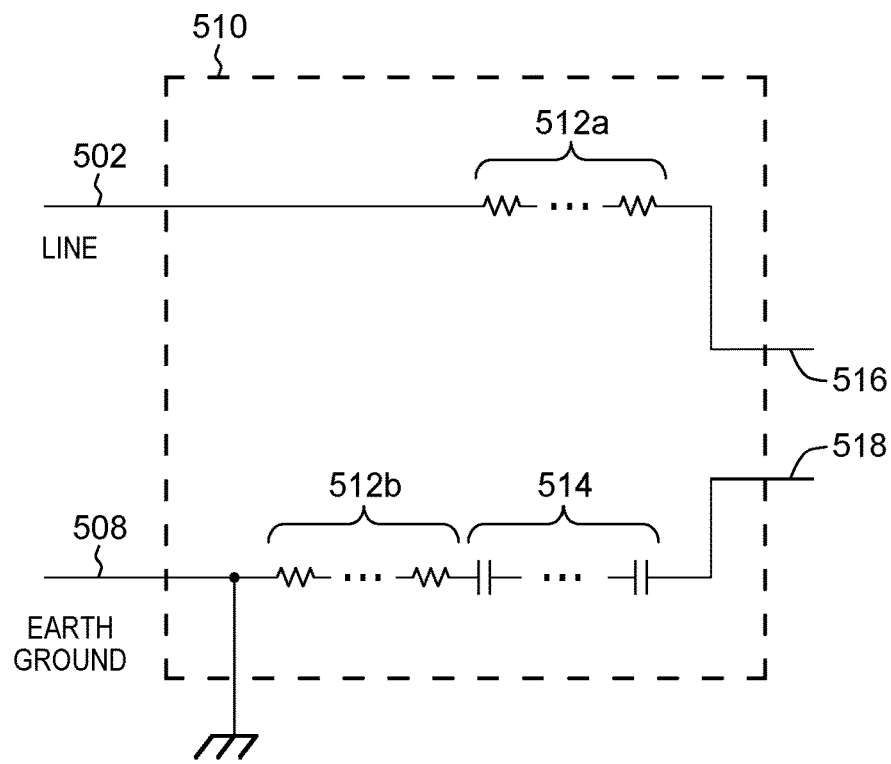

Referring to the barrier circuit 510 of FIG. 5F, there are plurality of resistors, in which (i) a first one or more resistors 512a are electrically coupled between the connection to the AC power (line 502) and the connection to the first input (516) of the bridge rectifier, and (ii) a second one or more resistors 512b and one or more capacitors 514 are electrically coupled in-series between the connection to Earth ground (508) and the connection to the second input (518) of the bridge rectifier.

Figure 5G:
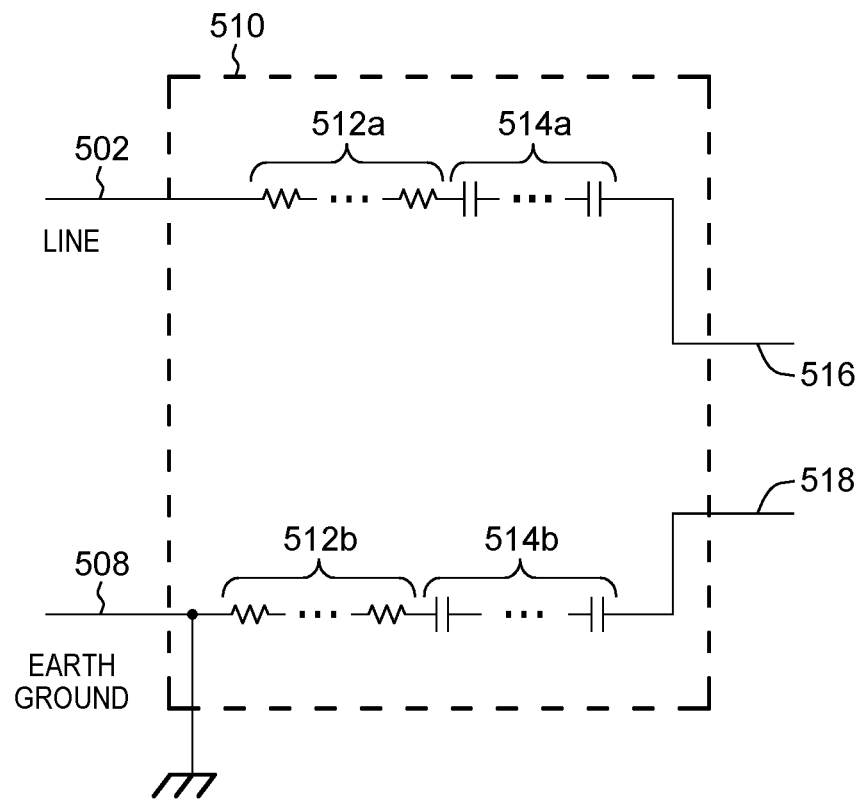

Referring to the barrier circuit 510 of FIG. 5G, there are plurality of resistors and a plurality of capacitors, in which (i) a first one or more resistors 512a and a first one or more capacitors 514a are electrically coupled in-series between the connection to the AC power (line 502) and the connection to the first input (516) of the bridge rectifier, and (ii) a second one or more resistors 512b and a second one or more capacitors 514b are electrically coupled in-series between the connection to Earth ground (508) and the connection to the second input (518) of the bridge rectifier.

Referring back to FIG. 4, the high power factor full bridge rectifier 420 is provided with passive power factor improvements. As noted, a purpose of reaching a high power factor is to keep the input current small while supplying enough DC energy to the next stage, the step-down switching DC-DC converter 430.

Figure 6:
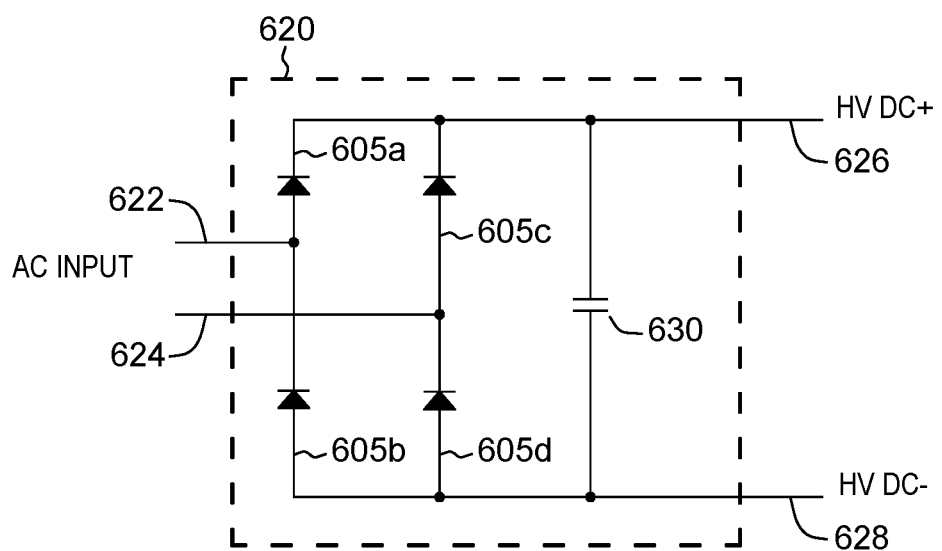
FIG. 6 depicts an example full bridge rectifier having a capacitor at the DC bus.

Two approaches may be used to boost the power factor. The first is to set the capacitance of a DC bus capacitor to be relatively small. FIG. 6 depicts an example full bridge rectifier having a capacitor at the DC bus. AC input to the bridge rectifier 620 is provided via first and second AC voltage inputs 622, 624. Outputs of the bridge rectifier 620 are positive DC rail 626 (high-voltage DC+) and negative DC rail 628 (high-voltage DC−). The positive and negative high-voltage DC are DC inputs to the step-down switching DC-DC converter (e.g. 430 of FIG. 4).

Figure 7:
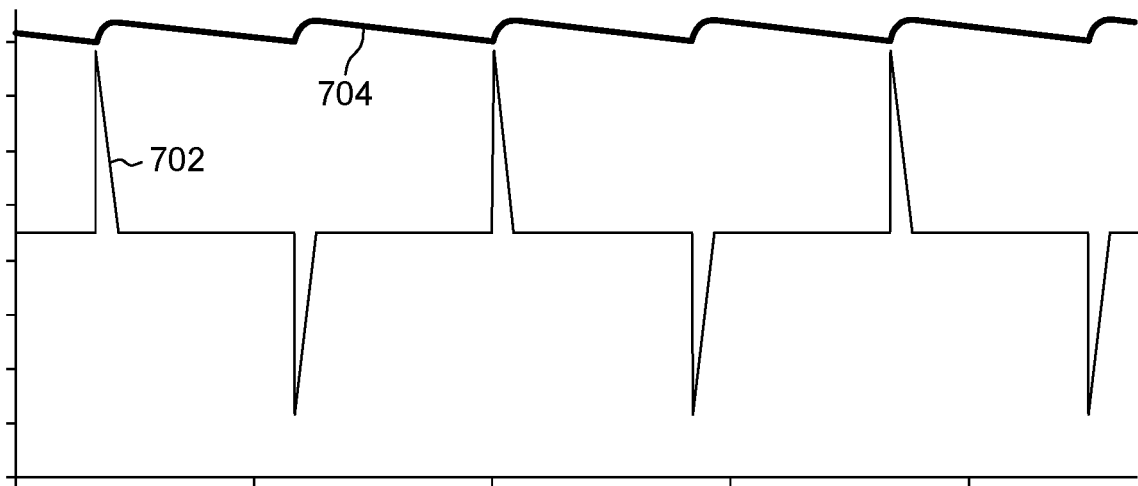
FIGS. 7-8 present example waveform plots of DC bus voltage and input AC current for power supplies with DC bus capacitors of varying capacitance.
Figure 8:
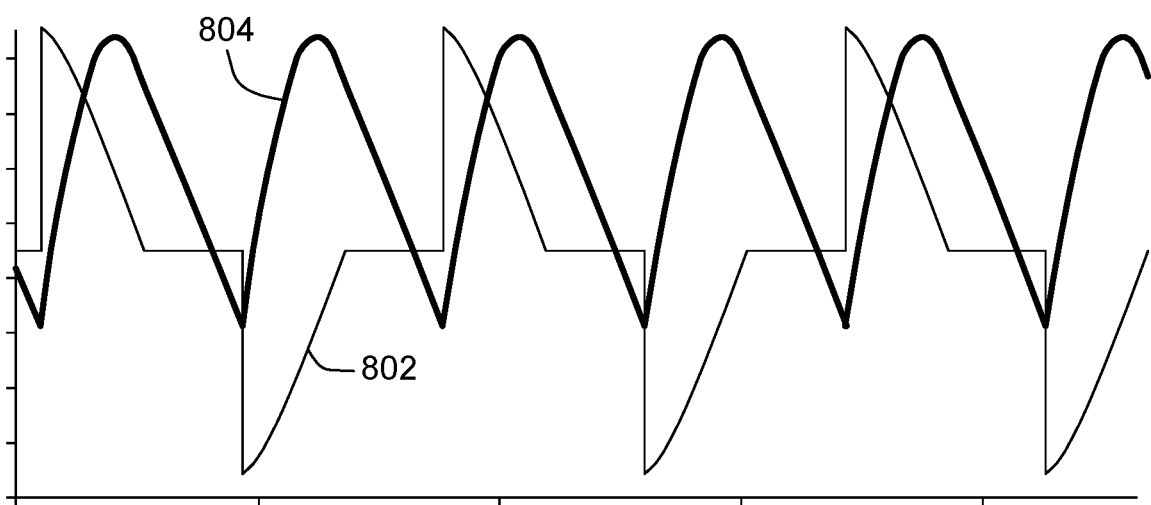

Bridge rectifier 620 also includes four diode legs 605a, 605b, 605c, 605d, each with a respective diode, and a bus capacitor 630 coupled between the positive and negative DC rails 626, 628. In a conventional full bridge rectifier circuit, the bus capacitor is selected to be of relatively large capacitance so that 'ripple' on the rectified DC bus is less than, say, 10% of the DC voltage. This is relatively large-capacitance scenario is depicted by FIG. 7. FIGS. 7-8 present example waveform plots of DC bus voltage and input AC current for power supplies with DC bus capacitors of varying capacitance. In particular, FIG. 7 presents an example waveform plot of DC bus voltage and input AC current for a power supply with a DC bus capacitor of relatively large capacitance and FIG. 8 presents an example waveform plot of DC bus voltage and input AC current for a power supply with a DC bus capacitor of relatively small capacitance.

Referring initially to FIG. 7, 702 is the waveform plot of the input AC current and 704 is the corresponding waveform plot of the DC bus voltage. Waveform 702 would theoretically look like a normal sine waveform but for the bus capacitor of relatively large capacitance (in this example), which causes the conduct angle of the bridge diodes to be very small. The waveform 702 exhibits a spike in each half-cycle, sacrificing conduction angle (represented by the small width of each spike in the AC input) in order to keep the ripple in the DC voltage small, as shown. This relatively small conduction angle leads to a relatively high total harmonics distortion (THD) in the input current and a low power factor. For the current shown in FIG. 7, THD is about 198% and the power factor is less than 0.4.

If the capacitance of the DC bus capacitor is reduced, the ripple on the DC bus may be increased as depicted by FIG. 8. 802 is the waveform plot of the input AC current and 804 is the corresponding waveform plot of the DC bus voltage. A benefit of reducing the capacitance of the bus capacitor is that the conduction angle of the bridge diodes is boosted (as seen by the wider spikes in the input AC current 802) and THD is reduced, thus the power factor is improved. In the example of FIG. 8, the DC bus has a high ripple—about 40% of the DC voltage—but the conduction angle is advantageously dramatically increased, which largely reduces the THD in the input current and boosts the power factor. For the AC current in FIG. 8, the THD is 64% and the power factor is increased to 0.67. This improvement means at the same output power, the input current is reduced by 68% compared to that of the scenario of FIG. 7.

In embodiments of the AC-DC power supply described herein, a regulated step-down switching DC-DC converter (430 of FIG. 4) is the next stage and high-low frequency ripple on the high voltage DC rail will not impact the low voltage DC (LVDC) output characteristics, such as regulation and ripple.

Figure 9:
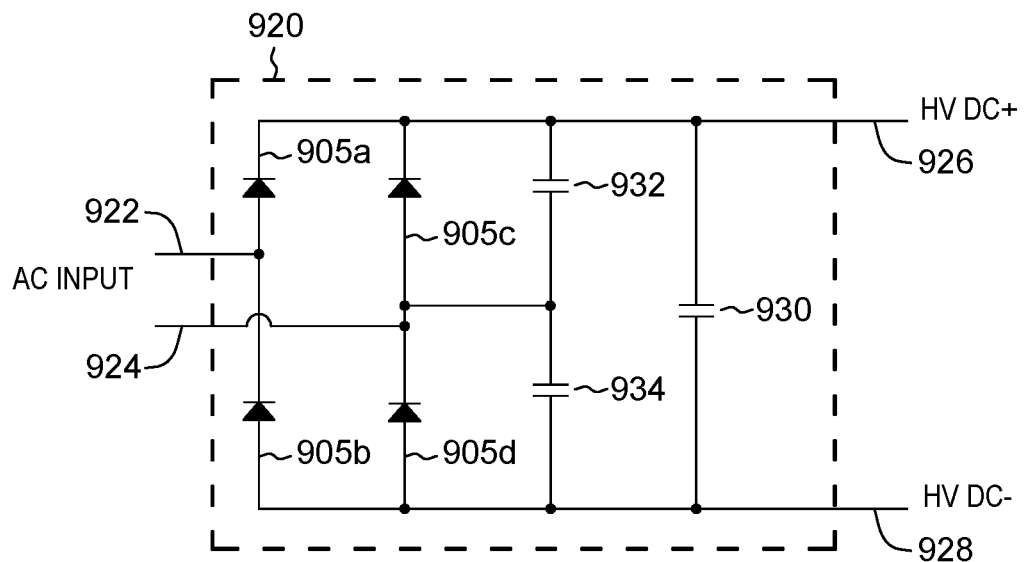
FIG. 9 depicts an embodiment of a high power factor bridge rectifier with leg capacitors and an output filter in accordance with aspects described herein.

The power factor can be further boosted by adding two leg capacitors to two legs of the full bridge rectifier. FIG. 9 depicts an example high power factor bridge rectifier with leg capacitors and an output filter, in accordance with aspects described herein. In FIG. 9, AC input to the bridge rectifier 920 is provided via positive and negative voltage inputs 922, 924, and outputs of the bridge rectifier 920 are positive DC rail 926 (high-voltage DC+) and negative DC rail 928 (high-voltage DC−). The bridge rectifier includes four diode legs 905a, 905b, 905c, 905d, each with a respective diode. Meanwhile, a filter capacitor 930 is electrically coupled between the positive and negative DC rails 926, 928. The bridge rectifier 920 further includes (i) a first additional capacitor 932 electrically coupled between an AC connection terminal 924 of the bridge rectifier and the positive DC rail 926 and (ii) a second additional capacitor 934 electrically coupled between the AC connection terminal 924 of the bridge rectifier and the negative DC rail 928. Capacitors 932, 934 are referred to as leg capacitors, and their capacitance can be selected to be smaller than the capacitance of the bus/filter capacitor 930. In some examples, the capacitance of each leg capacitor 932, 943 is smaller than one-third a capacitance of the filter capacitor 930.

Figure 10:
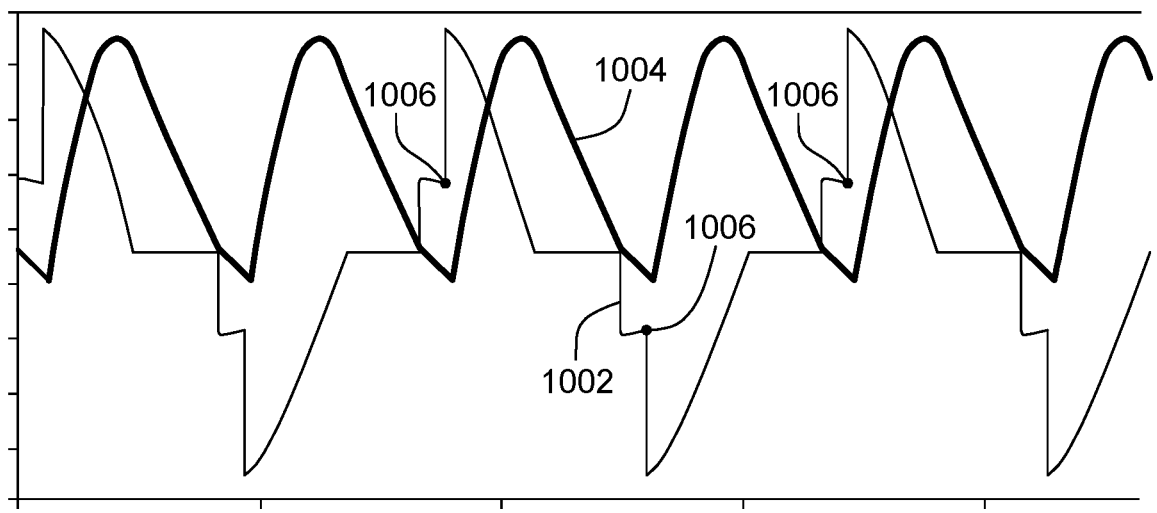
FIG. 10 depicts an example waveform plot of DC bus voltage and input AC for the example high power factor bridge rectifier of FIG. 9.

The leg capacitors help produce an even larger conduction angle, conforming the current waveform more closely to the theoretical sine waveform and thus increasing the power factor and reducing input current even further. FIG. 10 depicts an example waveform plot of DC bus voltage and input AC for the example high power factor bridge rectifier of FIG. 9, having a relatively small capacitance filter capacitor 930 as discussed above and two leg capacitors of even smaller capacitance. In FIG. 10, 1002 is the waveform plot of the input AC current and 1004 is the corresponding waveform plot of the DC bus voltage. FIG. 10 shows further improvement in the current waveform. Since the leg capacitors 932, 934 are of smaller capacitance compared to that of the bus capacitor 930, ripple level is not affected but the leg capacitors cause a step-up (at example points 1006) at diode turn-on at each positive and negative half cycle, thus further increasing the conduction angle, which further reduces THD of the input current and further increases the power factor. In the example of FIG. 10, THD is about 45% and the power factor is over 0.78. At the same output power, the input current of this scenario is reduced by almost half compared to that of the scenario of FIG. 7.

Figure 11:
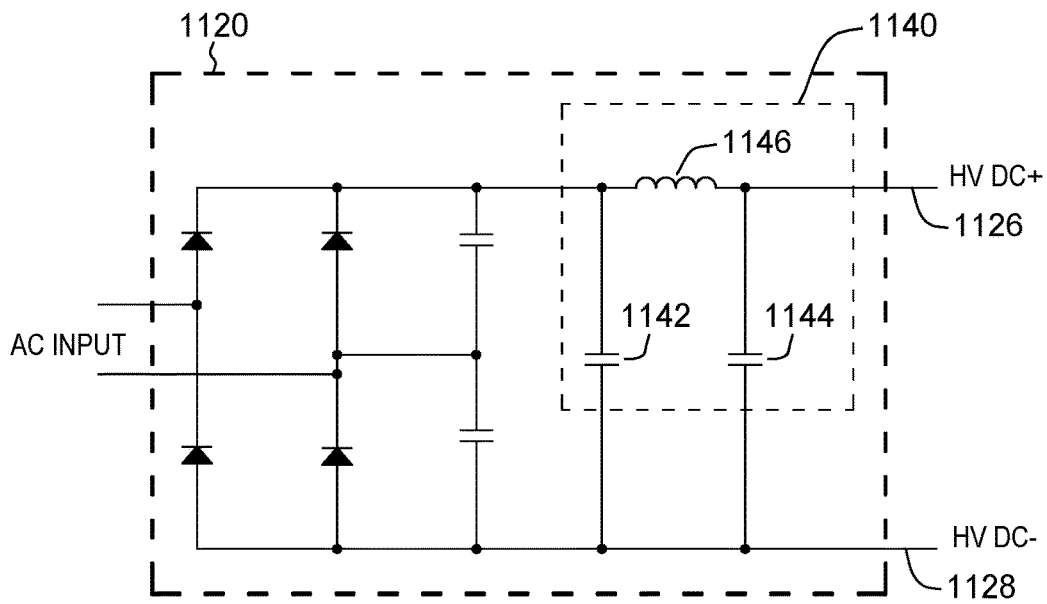
FIG. 11 depicts another embodiment of a high power factor bridge rectifier with leg capacitors and an output filter in accordance with aspects described herein.

In some examples, the output filter of the bridge rectifier, a single capacitor 930 in the example of FIG. 9, is instead a pi filter. FIG. 11 depicts such an example of a high power factor bridge rectifier with leg capacitors and a pi filter as the output filter. The bridge rectifier 1120 of FIG. 11 includes some components that are analogous to those of the bridge rectifier 920 of FIG. 9 and are not repeated for purposes of this discussion, except that the output filter of FIG. 9 (the single capacitor 930) is replaced in FIG. 11 with a pi filter 1140 that includes (i) a first capacitor 1142 electrically coupled between the positive and negative DC rails 1126, 1128, (ii) a second capacitor 1144 electrically coupled between those rails, as the first and second DC inputs to the next stage—the step-down switching DC-DC converter, and (iii) an inductor 1146 that is electrically coupled in-series between the first capacitor 1142 and the second capacitor 1144.

The capacitance of capacitors 1142 and 1144 can be selected sufficient small that the power factor improvement is still effective, i.e. extending closer to unity (1.0).

A third stage of a no-neutral AC-DC power supply (e.g. AC-DC power supply 400 of FIG. 4) as described herein is a step-down switching DC-DC converter (e.g. 430 of FIG. 4). The DC-DC converter generates low-voltage DC (LVDC) from the high-voltage DC (HVDC) bus output of the second stage (bridge rectifier, e.g. 420 of FIG. 4). FIGS. 12A-12E depict example differing embodiments of a step-down switching DC-DC converter in accordance with aspects described herein.

Figure 12A:
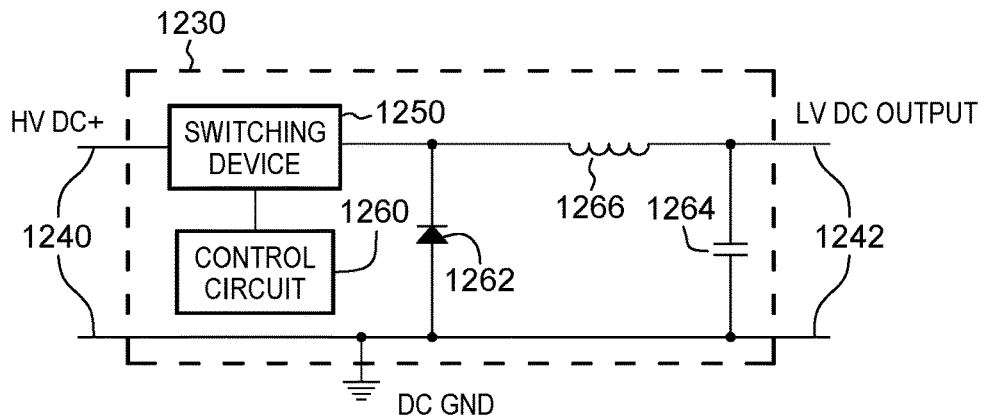
FIGS. 12A-12E depict example embodiments of a step-down switching DC-DC converter in accordance with aspects described herein.

Referring initially to FIG. 12A, step-down switching DC-DC converter 1230 has input 1240 for high-voltage DC and output 1242 for low-voltage DC power. It also includes a controlled switching device 1250 that is controlled by control circuit 1260, a diode 1262 (e.g. a flywheel diode here), an inductor 1266 and a capacitor 1264 between the output DC rails.

Figure 12B:
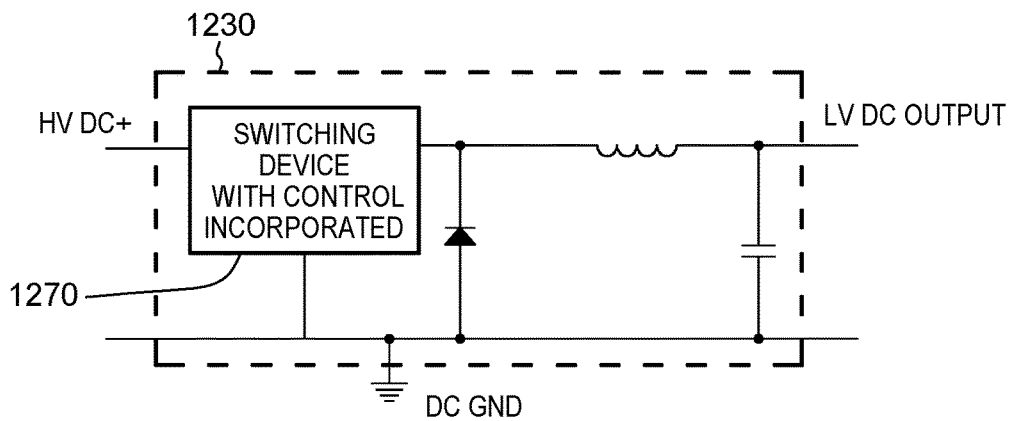

As an alternative, the control circuit and switching device can be incorporated together. FIG. 12B presents an identical DC-DC converter 1230 to that of FIG. 12A except that the control circuit is incorporated into the switching device as component 1270.

Figure 12C:
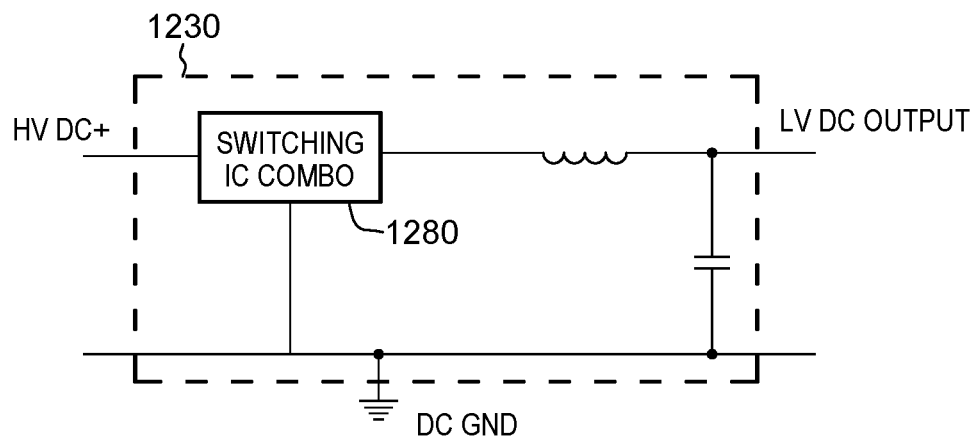

As yet another alternative, the diode can be incorporated into the switching component. FIG. 12C presents an identical DC-DC converter 1230 to that of FIG. 12B except that the diode is incorporated into the switching device as a switching integrated circuit component 1280.

Figure 12D:
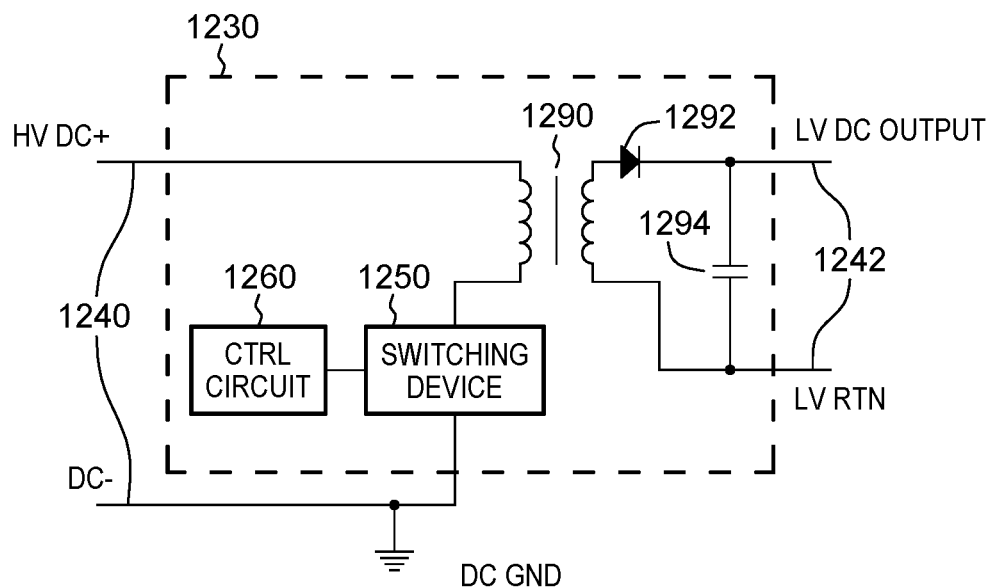

As another alternative, step-down switching DC-DC converter could be implemented as an isolated converter with a transformer inserted between HVDC and LVDC. FIG. 12D presents an example such converter. As shown in FIG. 12D, converter 1230 has input 1240 for high-voltage DC and output 1242 for low-voltage DC power. As input on the primary side of transformer 1290 is the input for the high-voltage DC and the isolated converter components 1250 (controlled switching device) and 1260 (control circuit). As output on the secondary side of transformer 1290 is the output low-voltage DC power 1242, with capacitor 1294 coupled between the output LVDC rails.

Figure 12E:
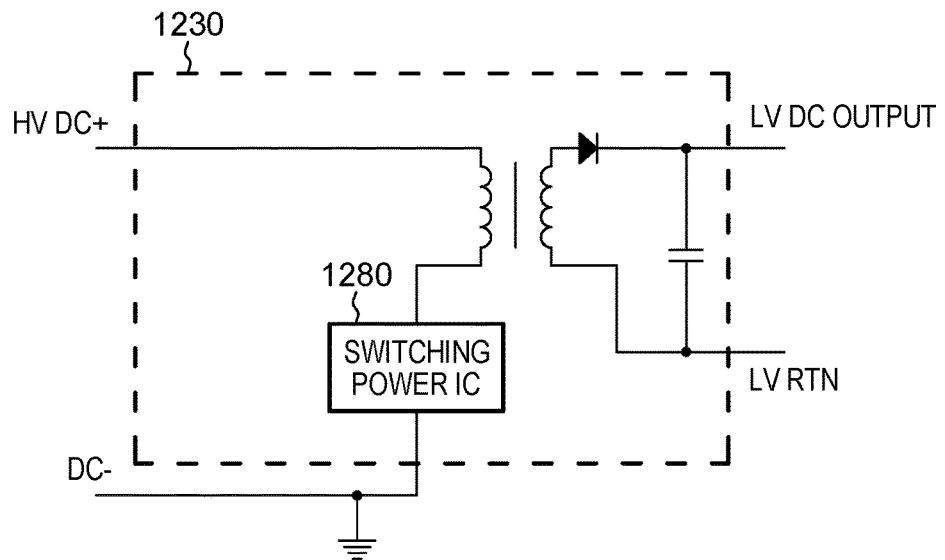

As an alternative to FIG. 12D, the control circuit and switching device can be incorporated together. FIG. 12E presents an identical DC-DC converter 1230 to that of FIG. 12D except that the control circuit is incorporated into the switching device as a switching power integrated circuit component 1280.

Figure 13:
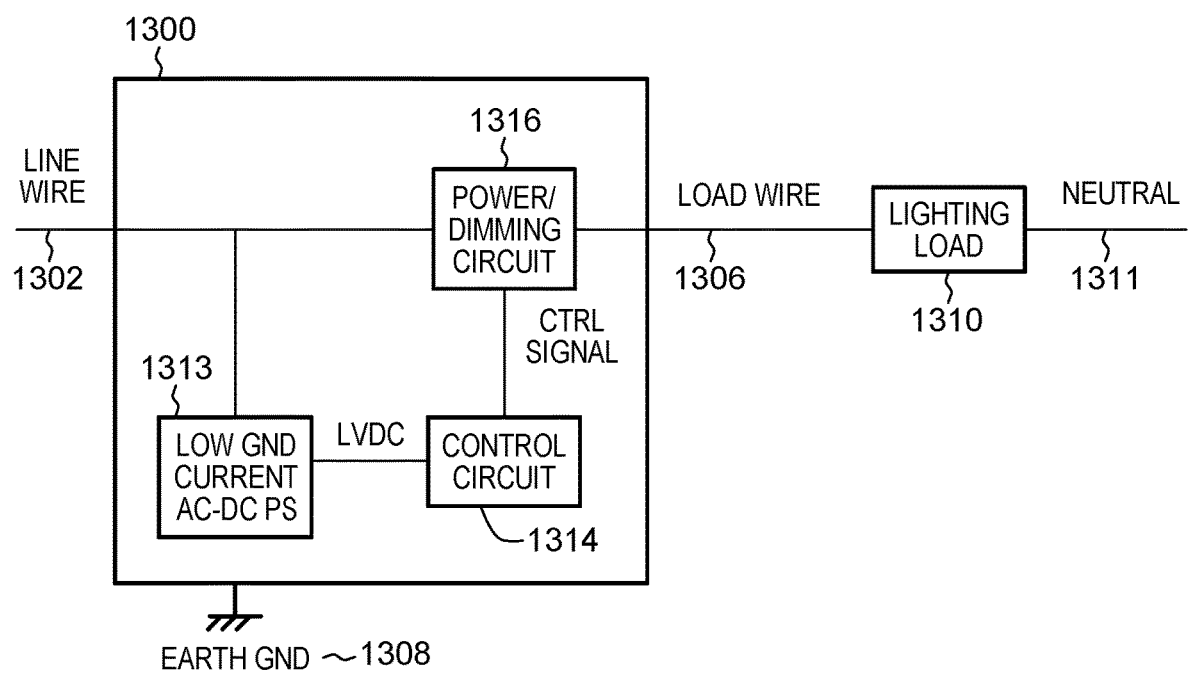
FIG. 13 depicts an embodiment of an electrical device having an AC-DC power supply in accordance with aspects described herein.

FIG. 13 depicts an example electrical device having an AC-DC power supply in accordance with aspects described herein. This is an example implementation that provides smart control in a two-wire wall switch unit with a low-ground-current AC-DC power supply as described herein. The device 1300 has respective connections for line (line wire 1302) and load (load wire 1306), in addition to its connection to Earth ground 1308. Device 1300 provides power to lighting load 1310 via line wire 1306, which returns via neutral line 1311. Device 1300 includes a low-ground-current AC-DC power supply 1313 as described herein, example embodiments of which are depicted and described with reference to FIGS. 4, 5A-5G, 9, 11 and 12A-12E. The AC-DC power supply 1313 receives input AC power from line 1302 and generates LVDC power to supply to a controller, microcontroller, or the like (i.e. control circuit 1314), which drives a control signal to power/dimming circuit 1316 that incorporates a switch for switching AC power on the load connection 1306 and thereby provides controlled power to the lighting load 1310. Advantageously, the power supply 1313 can generate sufficient power to power smart functionality, including network communication over, e.g., a wireless connection, of control circuit 1314.

Device 1313 of FIG. 13 therefore could be an electrical load controller for controlling conduction of the supply of input AC power to a load, where the load controller includes a line input terminal configured to be electrically coupled to the supply of AC power and a load output terminal configured to be electrically coupled to the load. With a switching circuit electrically coupled in series between the line input terminal and the load output terminal, which switching circuit has an ON state in which the switching circuit conducts the supply of AC power to the load and an OFF state in which the switching circuit does not conduct the supply of AC power to the load, a control circuit can be configured to control operation of the electrical load controller, including firing of the switching circuit, and an example AC-DC power supply as described herein can be provided to supply sufficient power to that control circuit for performing such functions.

Figure 14:
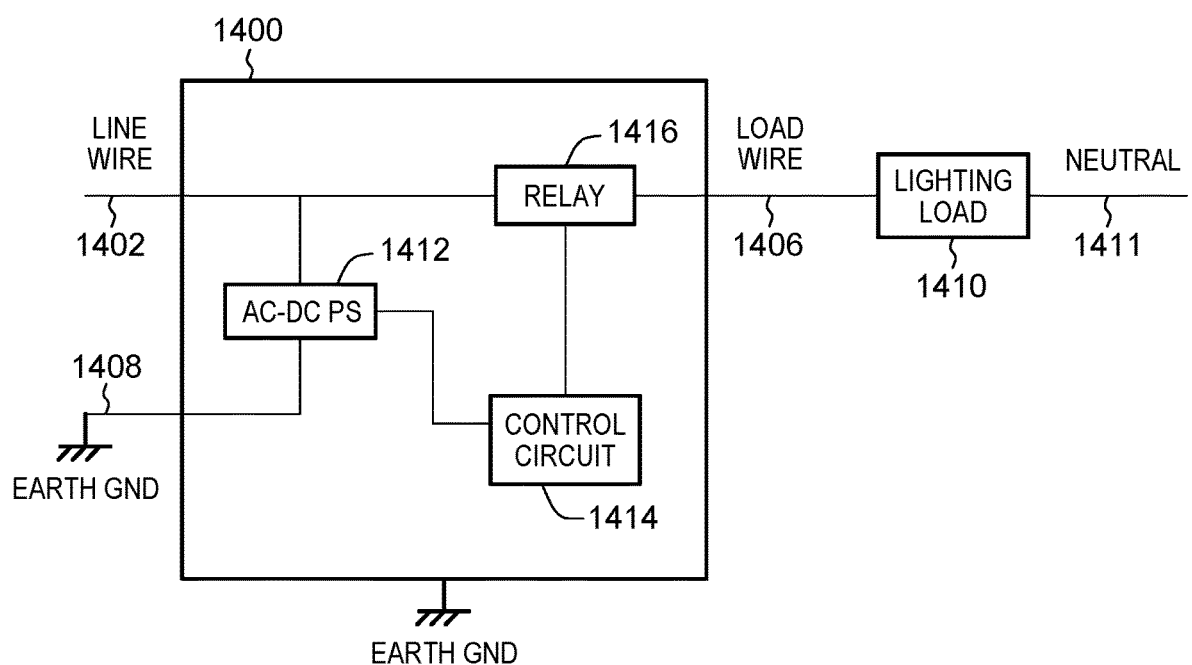
FIG. 14 depicts an example two-wire wall switch device utilizing ground current to generate control power.

FIG. 14 depicts an example two-wire wall switch device utilizing ground current to generate control power. Utilization of ground current to generate low-voltage DC power was described briefly above. Device 1400 has a connection to line (line wire 1402), load (load wire 1406) and Earth ground 1408. Device 1400 includes AC-DC power supply 1412 that powers a smart control circuit 1414, which drives a signal to relay 1416. Device 1400 provides power to lighting load 1410 via line wire 1406, which also has a connection to neutral 1411 as a return to the AC source.

Additional aspects are described herein that ensure an AC-DC power supply utilizing ground current remains compliant with ground current requirements (e.g. less than 0.7 or 0.5 mA) at single fault conditions. This makes it possible for example switched-mode power supplies with no neutral to meet full safety requirements. Aspects use a combination of component redundancy and an open-circuit to limit ground current to be desirably-small at any single component short-circuit condition.

Figure 15:
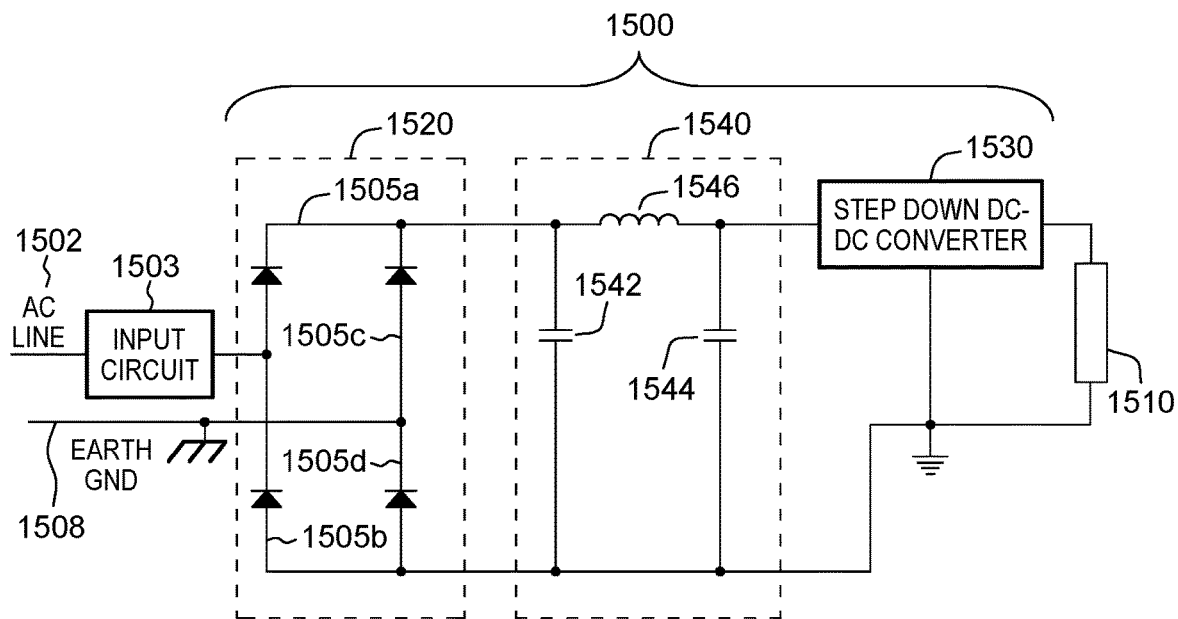
FIG. 15 depicts an example AC-DC power supply obtaining low-voltage control power from Earth ground current.

An example AC-DC power supply 1500 that obtains low-voltage control power from Earth ground current is depicted in FIG. 15. The AC-DC power supply 1500 is located between AC line 1502 and the Earth ground 1508, and includes input circuit 1503 a full bridge rectifier 1520 that includes four diode legs 1505a, 1505b, 1505c, and 1505d, each with a respective diode thereof, a filter circuit 1540 that in this example is a pi filter that includes capacitors 1542, 1544 and inductor 1546, and a step-down DC-DC converter 1530. The input circuit may include, but is not limited to, a barrier circuit such as that described herein, for instance above with reference to FIG. 12 and elsewhere. The AC-DC power supply 1500 provides DC power to load 1510, for instance a smart lighting control circuit described above that consumes the low-voltage DC power generated by the AC-DC power supply.

As noted, for safety reasons the utilization of ground current is constrained by way of safety standards, such as those of UL or NEC, specifying that ground current must not exceed some ultra-small limit. Per the UL60730-1 specification, for instance, this limit is 0.7 mA and per the UL773, UL916 and UL1472 specifications this limit is 0.5 mA.

Example implementations of AC-DC power supplies that can generate sufficient control power for a smart control circuit while meeting these ground current standards and other electromagnetic compatibility (EMC) and safety standards in normal operation are disclosed above.

An additional challenge related to ground current based power supplies is that the applicable ground current standard(s) also apply at single fault conditions, meaning the ground current cannot exceed (e.g.) 0.7 mA or 0.5 mA when any single component in the circuit is at short-circuit. For example, in the circuit of FIG. 15, the ground current (here the same as the line current) shall not exceed the same ultra-low current limit (0.5 mA or 0.7 mA) when any single component (such as any of the four leg diodes, capacitor 1542 or 1544, inductor 1546, or any component in input circuit 1503 or step-down DC-DC converter 1530) is at short circuit. Presented herein are approaches that limit ground current of a no-neutral AC-DC power supply at single fault of any component to the same or smaller level than its normal operating level (which by design must not exceed the applicable ultra-low current specification, e.g. 0.5 or 0.7 mA. "Fault" in this context is safety-relevant and is a failure (most likely a short-circuit) of or with a component.

In embodiments of limiting ground current at single-fault, aspects use (i) redundancy of components and (ii) fault event open-circuit protection to limit the ground current at single fault in an AC-DC power supply located between AC line and Earth ground.

More specifically, redundancy of components in front of the rectified DC bus to the step-down converter are provided with respect to the rectifier diodes and the filter capacitors sitting between the rectified DC positive rail and the rectified DC negative rail. For the bridge rectifier with four diode legs, each diode leg of the four diode legs is provided with respective diodes (two or more) electrically coupled in-series. Filter capacitors are also replicated to provide series-connected capacitors.

After the rectified DC bus, a fault event protection circuit is used to open the circuit on a fault condition. Such a fault-protection circuit, as described herein, is configured to sense (i) current from the step-down switching DC-DC converter, (ii) a first voltage from the step-down switching DC-DC converter, and/or (iii) a second voltage at an output of the step-down switching DC-DC converter, and trigger opening a switch when appropriate to prevent excessive current leakage, i.e. that would exceed the allowable leakage under the appropriate specification.

Figure 16:
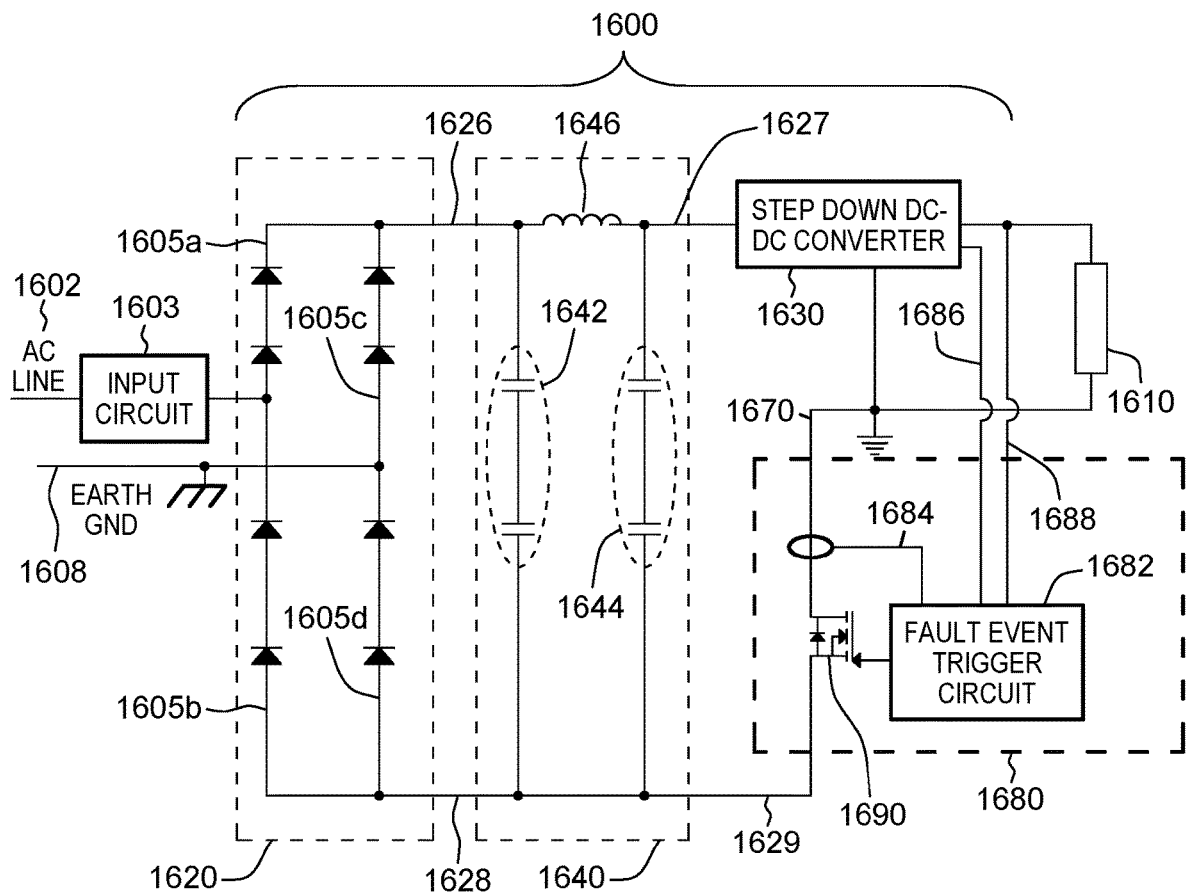
FIG. 16 depicts an embodiment of an AC-DC power supply incorporating fault-protection and limiting ground current in accordance with aspects described herein.

FIG. 16 depicts an embodiment of an AC-DC power supply 1600 incorporating fault-protection for and limiting ground current in accordance with aspects described herein. The AC-DC power supply sits between AC line 1602 and Earth ground 1608. After input circuit 1603 is a cascade diode bridge rectifier 1620 with redundancy of diodes. Specifically, the rectifier includes four diode legs 1605a, 1605b, 1605c, and 1605d, with each diode leg of the four diode legs including a respective plurality of diodes electrically coupled in-series.

Along the DC output rails 1626 (positive) and 1628 (negative) is output filter 1640. Output filter circuit 1640 in this example is a pi filter but with redundancy of capacitors. The filter 1640 includes (i) a first plurality 1642 of capacitors electrically coupled between the positive DC rail 1626 of the bridge rectifier 1620 and the negative DC rail 1628 of the bridge rectifier 1620, (ii) a second plurality 1644 of capacitors electrically coupled between the positive DC input 1627 of the step-down switching DC-DC converter 1630 and a return 1629 of a fault-protection circuit 1680, and (iii) an inductor 1646 electrically coupled between the first plurality 1642 of capacitors and the second plurality 1644 of capacitors.

Step-down switching DC-DC converter can be any desired DC-DC converter, such as one as described herein.

The fault-protection circuit 1680 includes a fault event trigger circuit 1682 that senses (i) current from the step-down switching DC-DC converter along line 1670 and via current sense line 1684, (ii) a first voltage from the step-down switching DC-DC converter 1630 via line 1686, and (iii) a second voltage via line 1688, which second voltage is an output voltage at an output of the step-down switching DC-DC converter 1630. The trigger circuit 1682 controls a switch 1690 which serially-coupled between the input 1627 of the step down converter 1630 and the negative DC rail 1628/1629.

Load 1610 is not a part of the example AC-DC power supply of FIG. 16 but is provided for context.

If a single fault (e.g. short circuit) occurs with any of the diodes on the diode legs of the bridge rectifier 1620, the input current will not change because of the diode redundancy provided; a short circuit of a single diode will not bring an apparent input current change. If a single fault (e.g.

short circuit) occurs with any one of the capacitors of 1642 or 1644, the input current will not change because of the redundancy provided in the series-connected capacitors.

Because the input circuit 1603 and the inductor 1646 are serial-connected inside the AC-DC power supply, a short-circuit of either of them will not bring apparent input current change, though it may impact EMC. Therefore, in this example redundancy in either is not provided.

If the single fault occurs after the rectified DC bus, such as inside or at an output of the step-down DC-DC converter 1630, the fault-protection circuit 1680 functions as the protection mechanism to open the switch to limit the input current within the leakage current standard.

Figure 17:
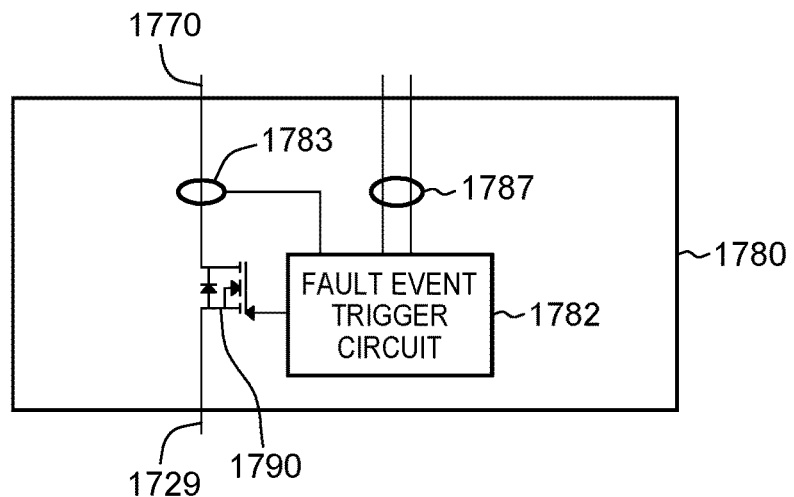
FIG. 17 depicts an embodiment of a fault-protection circuit in accordance with aspects described herein.

Further details of the fault-protection circuit 1680 are provided with reference to FIG. 17, depicting an embodiment of such a fault-protection circuit. This circuit 1780 is connected in this example in-series between the low voltage DC return (DC ground) 1770 (e.g. 1670 of FIG. 16) and the rectified high-voltage negative DC rail 1729 (e.g. 1629 of FIG. 16). It includes a current sensing circuit 1783, a voltage sense circuit 1787 (which has one or more voltage sense points), a fault event trigger circuit 1782 and an on/off switch 1790. In some examples, the current and voltage sense circuits 1783, 1787 are sense points.

The mechanism of this fault-protection circuit 1780 is as follows: If a single fault (e.g. short-circuit) occurs inside or at the output of the step-down DC-DC converter, sensed current or voltage at the critical points of the converter will have an abnormal value. The sensed abnormal current or voltage is sent to the fault-protection circuit 1780, which detects it as a fault, and the trigger circuit 1782 triggers the turn-off action of the on/off switch 1790, thereby opening the circuit. When the circuit between the DC ground 1770 and high voltage negative rail 1729 is open, the input current (i.e. ground current) will drop to a level below the standardized maximum ground current limit.

The fault-protection circuit thus detects (i) a fault inside the step-down switching DC-DC converter based on sensing the current or the first voltage (from within the step-down switching DC-DC converter), and/or (ii) a fault at the output of the step-down switching DC-DC converter based on sensing the second voltage (at the output of the DC-DC converter), and, based on detecting the fault inside the step-down switching DC-DC converter or the fault at the output of the step-down switching DC-DC converter, triggers opening the switch of the fault-protection circuit between a return of the output voltage from the step down switching DC-DC converter and the negative DC rail of the bridge rectifier.

Figure 18:
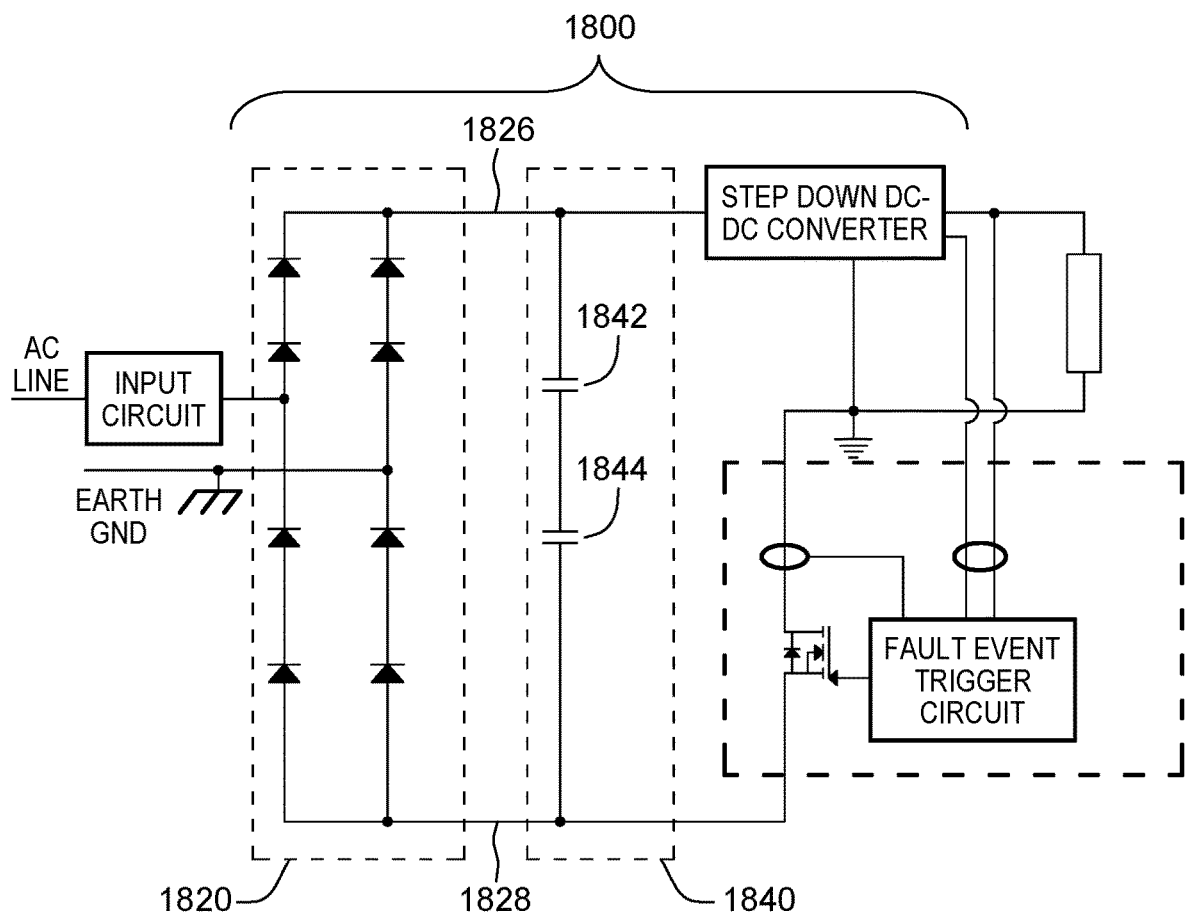
FIGS. 18-20 depict additional embodiments of an AC-DC power supply incorporating fault-protection and limiting ground current in accordance with aspects described herein.
Figure 19:
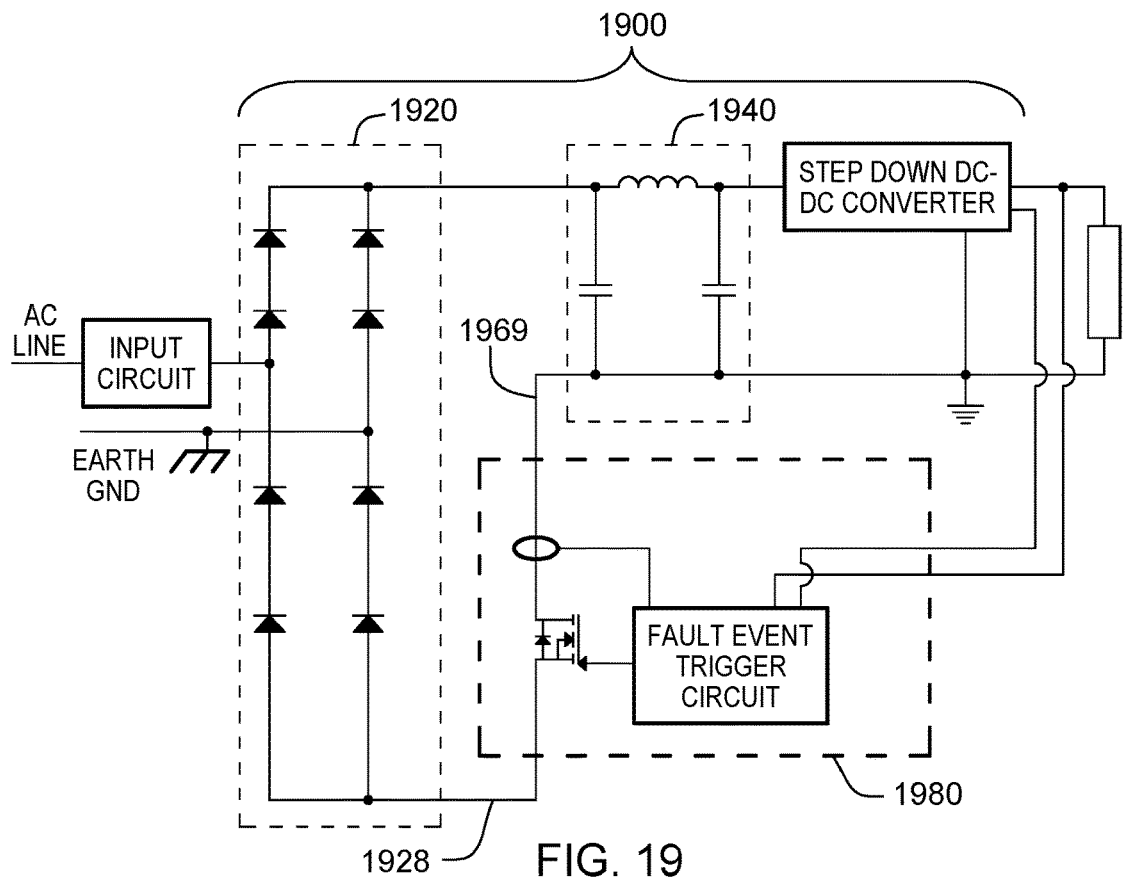
Figure 20:
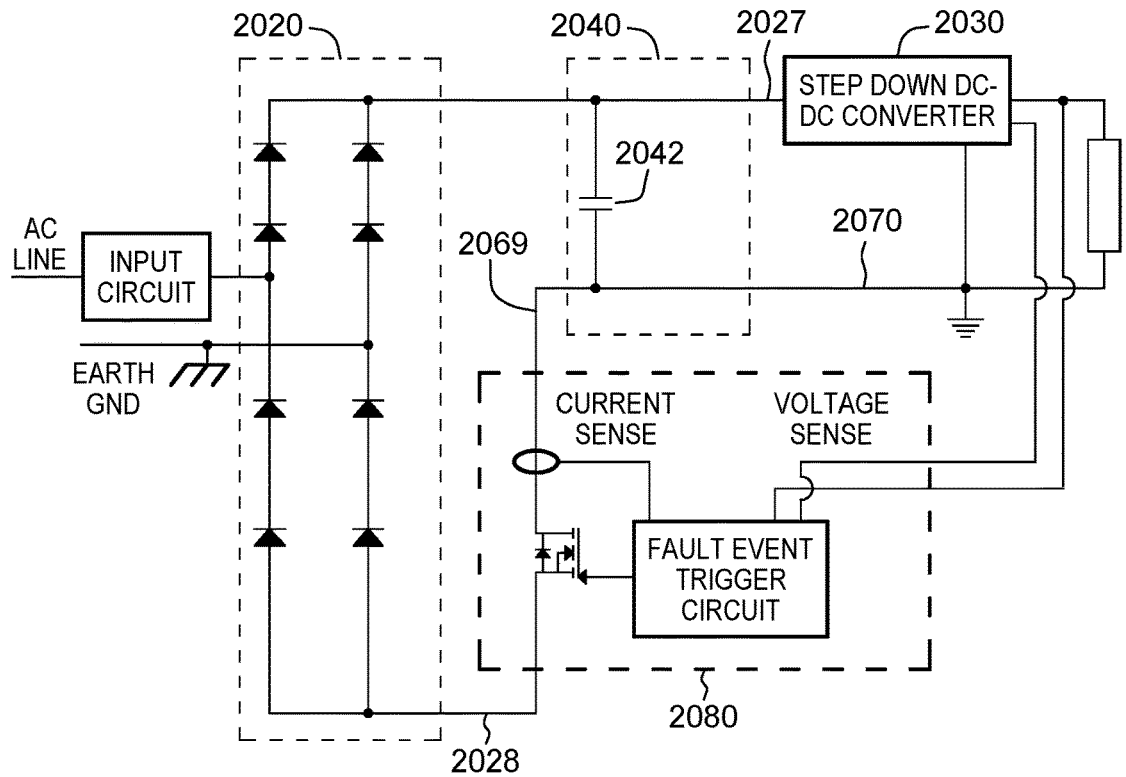

FIGS. 18-20 depict additional embodiments of an AC-DC power supply incorporating fault-protection and limiting ground current in accordance with aspects described herein. Referring initially to FIG. 18, presented is an AC-DC power supply 1800 identical in components to that of FIG. 16 except that the output filter 1640 of FIG. 16 (which was a pi filter with redundant capacitors) is replaced with filter 1840 having two capacitors 1842, 1844 electrically coupled between the positive DC rail 1826 of the bridge rectifier and the negative DC rail 1828 of the bridge rectifier 1820. An advantage of this approach is cost savings achieved by eliminating additional capacitors and the inductor as seen in FIG. 16.

As yet another alternative to FIG. 16, the output filter (e.g. pi filter) may be relocated to after the fault-protection circuit, as shown in FIG. 19. FIG. 19 includes components analogous to those of FIG. 16 except the fault-protection circuit 1980 is coupled between the return rail 1969 of the output filter 1940 and the negative DC rail 1928 of the bridge rectifier 1920. Meanwhile, redundant capacitors in the filter could be eliminated, as depicted in this example.

As an alternative to FIG. 19, the filter circuit 1940 (a pi-filter in FIG. 19) may be replaced by a single capacitor. This is depicted in the example of FIG. 20, which is analogous to FIG. 19 except that in the output filter 2040, a capacitor 2042 is electrically coupled between the positive DC input 2027 and a negative DC input 2070 to the step-down switching DC-DC converter 2030. Like in FIG. 19, the fault-protection circuit 2080 is electrically coupled between the return 2069 of the output voltage from the filter circuit 2040 (i.e. return of the input of the step-down DC-DC converter) and the negative DC rail 2028 of the bridge rectifier 2020.

Although various examples are provided, variations are possible without departing from a spirit of the claimed aspects. Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. An electrical device comprising:
   an alternating current to direct current (AC-DC) power supply configured to receive a supply of input alternating current (AC) power and to output direct current (DC) power, the AC-DC power supply comprising:
   a bridge rectifier comprising an output filter, the bridge rectifier configured to generate direct current from alternating current, wherein the bridge rectifier comprising the output filter has a power factor of at least 0.7;
   a barrier circuit electrically coupled between the AC power and the bridge rectifier, and having at least two selected from the group consisting of: a connection to the AC power, a connection to Earth ground, a connection to a first input of the bridge rectifier, and a connection to a second input of the bridge rectifier, wherein the barrier circuit comprises one or more resistors and one or more capacitors; and
   a step-down switching DC-DC converter electrically coupled to the bridge rectifier and configured to receive a first DC voltage from the bridge rectifier and output the DC power, the DC power having a second DC voltage lower than the first DC voltage.

2. The electrical device of claim 1, wherein the one or more resistors and the one or more capacitors of the barrier circuit are electrically coupled in-series between the connection to the AC power and the connection to the first input of the bridge rectifier.

3. The electrical device of claim 1, wherein the one or more resistors and the one or more capacitors of the barrier circuit are electrically coupled in-series between the connection to Earth ground and the connection to the second input of the bridge rectifier.

4. The electrical device of claim 1, wherein the one or more capacitors of the barrier circuit comprises a plurality of capacitors, wherein (i) a first one or more capacitors of the plurality of capacitors and the one or more resistors of the barrier circuit are electrically coupled in-series between the connection to the AC power and the connection to the first input of the bridge rectifier, and (ii) a second one or more capacitors of the plurality of capacitors are electrically coupled between the connection to Earth ground and the connection to the second input of the bridge rectifier.

5. The electrical device of claim 1, wherein the one or more resistors of the barrier circuit comprises a plurality of resistors, wherein (i) a first one or more resistors of the plurality of resistors and the one or more capacitors of the barrier circuit are electrically coupled in-series between the connection to the AC power and the connection to the first input of the bridge rectifier and (ii) a second one or more resistors of the plurality of resistors are electrically coupled between the connection to Earth ground and the connection to the second input of the bridge rectifier.

6. The electrical device of claim 1, wherein the one or more capacitors of the barrier circuit comprises a plurality of capacitors, wherein (i) a first one or more capacitors of the plurality of capacitors and the one or more resistors of the barrier circuit are electrically coupled in-series between the connection to Earth ground and the connection to the second input of the bridge rectifier and (ii) a second one or more capacitors of the plurality of capacitors are electrically coupled between the connection to the AC power and the connection to the first input of the bridge rectifier.

7. The electrical device of claim 1, wherein the one or more resistors of the barrier circuit comprises a plurality of resistors, wherein (i) a first one or more resistors of the plurality of resistors and the one or more capacitors of the barrier circuit are electrically coupled in-series between the connection to Earth ground and the connection to the second input of the bridge rectifier and (ii) a second one or more resistors of the plurality of resistors are electrically coupled between the connection to the AC power and the connection to the first input of the bridge rectifier.

8. The electrical device of claim 1, wherein the one or more resistors of the barrier circuit comprises a plurality of resistors and the one or more capacitors of the barrier circuit comprises a plurality of capacitors, wherein (i) a first one or more resistors of the plurality of resistors and a first one or more capacitors of the plurality of capacitors are electrically coupled in-series between the connection to the AC power and the connection to the first input of the bridge rectifier and (ii) a second one or more resistors of the plurality of resistors and a second one or more capacitors of the plurality of capacitors are electrically coupled in-series between the connection to Earth ground and the connection to the second input of the bridge rectifier.

9. The electrical device of claim 1, wherein the bridge rectifier comprises a positive DC rail and a negative DC rail, wherein the output filter comprises a filter capacitor electrically coupled between the positive DC rail and the negative DC rail, and wherein the bridge rectifier further comprises:
a first additional capacitor electrically coupled between an AC connection terminal of the bridge rectifier and the positive DC rail; and
a second additional capacitor electrically coupled between the AC connection terminal of the bridge rectifier and the negative DC rail, wherein a capacitance of the first additional capacitor and a capacitance of the second additional capacitor are each smaller than one-third a capacitance of the filter capacitor.

10. The electrical device of claim 9, wherein the output filter comprises a pi filter, wherein the filter capacitor is a first capacitor of the pi filter, and wherein the pi filter further comprises:
a second capacitor electrically coupled between first and second DC inputs to the step-down switching DC-DC converter; and
an inductor electrically coupled in-series between the first capacitor and second capacitor.

11. The electrical device of claim 1, wherein the step-down switching DC-DC converter comprises:
a controlled switching device; and
a flywheel diode.

12. The electrical device of claim 1, wherein the step-down switching DC-DC converter comprises:
an input for the first DC voltage and an output for the DC power;
an isolated converter having a controlled switching device; and
a transformer with (i) the input for the first DC voltage and the isolated converter as input on a primary side of the transformer, and (ii) the output for the DC power as output on a secondary side of the transformer.

13. The electrical device of claim 1, wherein
the bridge rectifier comprises four diode legs, each diode leg of the four diode legs comprising a respective plurality of diodes electrically coupled in-series, and the bridge rectifier further comprises a positive directed current (DC) rail and a negative DC rail
and wherein the electrical device further comprises a fault-protection circuit, wherein the fault-protection circuit is configured to perform sensing at least one selected from the group consisting of: (i) current from the step-down switching DC-DC converter, (ii) a first voltage from the step-down switching DC-DC converter, and (iii) a second voltage, the second voltage being an output voltage at an output of the step-down switching DC-DC converter.

14. The electrical device of claim 13, wherein the fault-protection circuit is further configured to perform:
detecting (i) a fault inside the step-down switching DC-DC converter based on sensing the current or the first voltage, or (ii) a fault at the output of the step-down switching DC-DC converter based on sensing the second voltage; and
based on detecting the fault inside the step-down switching DC-DC converter or the fault at the output of the step-down switching DC-DC converter, triggering opening a switch of the fault-protection circuit between a return of the output voltage from the step down switching DC-DC converter and the negative DC rail of the bridge rectifier.

15. The electrical device of claim 13, further comprising a pi filter, the pi filter comprising (i) a first plurality of capacitors electrically coupled between the positive DC rail of the bridge rectifier and the negative DC rail of the bridge rectifier, (ii) a second plurality of capacitors electrically coupled between a positive DC input of the step-down switching DC-DC converter and a return of the fault-protection circuit, and (iii) an inductor electrically coupled between the first plurality of capacitors and the second plurality of capacitors.

16. The electrical device of claim 15, wherein the fault-protection circuit is coupled between a return rail of the pi filter and the negative DC rail of the bridge rectifier.

17. The electrical device of claim 13, further comprising a plurality of capacitors electrically coupled in-series between the positive DC rail of the bridge rectifier and the negative DC rail of the bridge rectifier.

18. The electrical device of claim 13, further comprising a capacitor electrically coupled between a positive DC input and a negative DC input to the step-down switching DC-DC converter, wherein the fault-protection circuit is electrically coupled between a return of the output voltage and the negative DC rail of the bridge rectifier.

* * * * *